US012271474B2

(12) United States Patent
Harang et al.

(10) Patent No.: US 12,271,474 B2
(45) Date of Patent: *Apr. 8, 2025

(54) AUGMENTED SECURITY RECOGNITION TASKS

(71) Applicant: Sophos Limited, Abingdon (GB)

(72) Inventors: Richard Edward Harang, Alexandria, VA (US); Ethan McAvoy Rudd, Fort Collins, CO (US); Konstantin Berlin, Potomac, MD (US); Cody Marie Wild, Berkeley, CA (US); Felipe Nicolás Ducau, Neuquen (AR)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,607

(22) Filed: May 25, 2023

(65) Prior Publication Data
US 2024/0126876 A1    Apr. 18, 2024

Related U.S. Application Data

(63) Continuation of application No. 17/401,959, filed on Aug. 13, 2021, now Pat. No. 11,681,800, which is a (Continued)

(51) Int. Cl.
*H04L 9/40* (2022.01)
*G06F 21/55* (2013.01)
(Continued)

(52) U.S. Cl.
CPC ............ *G06F 21/56* (2013.01); *G06F 21/552* (2013.01); *G06F 21/562* (2013.01);
(Continued)

(58) Field of Classification Search
CPC . H04L 9/40; G06F 21/55; G06F 21/56; G06F 21/552; G06F 21/562; G06F 21/566; G06N 3/045; G06N 3/08; G06N 20/00
See application file for complete search history.

(56) References Cited

U.S. PATENT DOCUMENTS 9,690,938 B1 * 6/2017 Saxe ................ G06N 20/00
10,063,582 B1 * 8/2018 Feng ................ H04L 63/1433
(Continued)

FOREIGN PATENT DOCUMENTS

AU    2018328515 C1 *  6/2021   ......... G06F 11/3692
CN       111797997       10/2020
WO    WO-2018184682      10/2018

OTHER PUBLICATIONS

USPTO, "U.S. Appl. No. 17/401,959 Notice of Allowance mailed Feb. 2, 2023", 12 pages.
(Continued)

*Primary Examiner* — Jayesh M Jhaveri
(74) *Attorney, Agent, or Firm* — Strategic Patents, P.C.

(57) ABSTRACT

A system for conducting a security recognition task, the system comprising a memory configured to store a model and training data including auxiliary information that will not be available as input to the model when the model is used as a security recognition task model for the security recognition task. The system further comprising one or more processors communicably linked to the memory and comprising a training unit and a prediction unit. The training unit is configured to receive the training data and the model from the memory and subsequently provide the training data to the model, and train the model, as the security recognition task model, using the training data to predict the auxiliary information as well as to perform the security recognition task, thereby improving performance of the security recognition task. The prediction unit is configured to use the security recognition task model output to perform the security recognition task while ignoring the auxiliary attributes in the model output.

20 Claims, 12 Drawing Sheets

Related U.S. Application Data continuation of application No. PCT/GB2020/050370, filed on Feb. 17, 2020.

(60) Provisional application No. 62/806,423, filed on Feb. 15, 2019.

(51) Int. Cl.
*G06F 21/56* (2013.01)
*G06N 3/045* (2023.01)
*G06N 3/08* (2023.01)
*G06N 20/00* (2019.01)

(52) U.S. Cl.
CPC ............ *G06F 21/566* (2013.01); *G06N 3/045* (2023.01); *G06N 3/08* (2013.01); *G06N 20/00* (2019.01)

(56) References Cited

U.S. PATENT DOCUMENTS

| | | | |
|---|---|---|---|
| 10,353,764 B1 | 7/2019 | Cazzanti et al. | |
| 11,194,910 B2* | 12/2021 | Mazumder | ............ G06F 21/566 |
| 2007/0294768 A1* | 12/2007 | Moskovitch | .......... G06F 21/566 |
| | | | 726/24 |
| 2014/0199663 A1* | 7/2014 | Sadeh-Koniecpol | ........................ |
| | | | H04L 63/1408 |
| | | | 434/118 |
| 2016/0092684 A1 | 3/2016 | Langton et al. | |
| 2017/0372071 A1 | 12/2017 | Saxe | |
| 2018/0189484 A1 | 7/2018 | Danahy et al. | |
| 2019/0132334 A1* | 5/2019 | Johns | .................... G06F 21/562 |
| 2019/0260784 A1* | 8/2019 | Stockdale | ............... G06F 18/23 |
| 2020/0074327 A1 | 3/2020 | Yamamoto et al. | |
| 2021/0374239 A1 | 12/2021 | Harang et al. | |

OTHER PUBLICATIONS

ISA, "PCT Serial No. PCT/GB20/050370 International Search Report and Written Opinion mailed Apr. 1, 2020", 11 pages.

UKIPO, "UK Application No. 2111361.8 First Examination Report mailed Jul. 5, 2022", 3 pages.

* cited by examiner

AUGMENTED SECURITY RECOGNITION TASKS

CROSS-REFERENCE TO RELATED APPLICATIONS

This application is a continuation of U.S. patent application Ser. No. 17/401,959 filed on Aug. 13, 2021 (now U.S. Pat. No. 11,681,800), which is a bypass continuation that claims priority to International Patent Application No. PCT/GB2020/050370 filed on Feb. 17, 2020, which claims priority to U.S. Provisional Application No. 62/806,423 filed on Feb. 15, 2019, where the entire content of each of the foregoing is hereby incorporated by reference.

FIELD OF INVENTION

The present application relates to the use of machine learning for information security. Specifically, but not exclusively, the present application relates to training and using a machine learning model to perform a security recognition task, and particularly training and using a multi-target neural network to perform a security recognition task. Specifically, but not exclusively, the present application relates to training and using a multi-target neural network to detect a portable executable file as malware.

BACKGROUND

Traditional approaches to information security, in particular traditional approaches to malware identification, aim to detect potentially malicious files by utilising signature engines which reactively blacklist or whitelist files that hard-match manually-defined patterns (signatures). Whilst signature-based methods to security threat detection have the benefit of being well understood, they are limited to being able to detect only a set of know, pre-defined, threats. As such, signature-based engines are unable to generalise beyond the manually-defined signatures.

In contrast, machine learning based information security engines employ numerical optimization on parameters of highly parametric models to learn more general concepts of "malicious" and "non-malicious" using a training data set of known malicious and non-malicious files. Machine learning therefore allows a degree of proactive detection of previously unseen malicious activity that is not typically provided by signature-only engines. Particularly, machine learning based engines have the potential to generalise beyond malicious and non-malicious examples forming the training data set in order to detect novel examples of malicious files.

Machine learning models are trained to identify malicious and benign security threats by learning to identify patterns associated with known malicious and benign files in the training data. The training data typically comprises a large number of samples along with a corresponding number of labels indicative of whether or not the file associated with a given sample is a malicious, or benign, security threat. For each file in the training data, a numerical feature vector is extracted, and the machine learning algorithm is trained to maximize the conditional probability of correctly predicting a malicious or benign label given the numerical feature vector for all samples in the training data.

When training machine learning models for information security tasks, there is often substantial metadata which is available at training time, but such metadata is not necessarily available when the machine learning model is used for the information security task. This metadata contains more information about each input sample than just an aggregate label of whether a sample is malicious or benign. Such metadata can include malicious or benign labels from multiple sources (e.g., from various security authorities or vendors), textual descriptions, file attributes, temporal information, geographical location information, counts of affected endpoints, and associated tags.

Known prior art approaches to machine learning for security recognition tasks ignore any available metadata, and simply train the machine learning model on the security recognition task target—i.e., malicious or benign labels.

As such, it is desirable to enable a machine learning based security recognition task system to utilise metadata in order to train a more robust, efficient, and accurate model.

SUMMARY OF INVENTION

According to an aspect of the present invention, there is provided a system for conducting a security recognition task, the system comprising a memory configured to store a model and training data including auxiliary information that will not be available as input to the model when the model is used as a security recognition task model for the security recognition task. The system further comprising one or more processors communicably linked to the memory and comprising a training unit and a prediction unit. The training unit is configured to receive the training data and the model from the memory and subsequently provide the training data to the model. The training unit is further configured to train the model, as the security recognition task model, using the training data to predict the auxiliary information as well as to perform the security recognition task, thereby improving performance of the security recognition task. The prediction unit is configured to: use the security recognition task model output to perform the security recognition task while ignoring the auxiliary attributes in the model output.

Beneficially, the machine learning model is trained to incorporate metadata into the training process, thereby learning a more robust and better performing machine learning model. Furthermore, in settings where the machine learning model is used to perform multiple security recognition tasks, the training system of the present invention provides a more compact and efficient system which requires only a single model to be trained, deployed, and maintained, rather than multiple models for the multiple security recognition tasks.

Preferably, the training unit is further configured to jointly optimize a security recognition task loss function and an auxiliary information loss function.

Joint optimization of multiple loss functions provides a flexible framework which allows auxiliary information to be utilised at the time of training to help improve performance of a security recognition task. By defining different loss functions for the security recognition task and for the auxiliary information, aspects unique to the security recognition task and the auxiliary information can be leveraged during the training process to help efficiently train a more robust model.

Optionally, the training unit is further configured to assign a first weight to the security recognition task loss function and a second weight to the auxiliary information loss function. Optionally, the first weight is greater than the second weight.

Beneficially, weighting the loss functions allows for fine grained control over the contribution of each loss function to the joint optimization. Such control ensures that the auxiliary information loss function does not dominate the optimization process, which could result in a reduction in the performance of the security recognition task.

Preferably, the model is a multi-target neural network. Preferably, the multi-target neural network comprises a base network configured to receive a sample associated with a portable executable file and produce an intermediate output, a security recognition task classification network configured to receive the intermediate output and produce the security recognition task prediction, and an auxiliary information classification network configured to receive the intermediate output and produce the auxiliary information prediction.

Beneficially, the base network acts as a feature extraction network for the security recognition task classification network and the auxiliary information classification network. By training the multi-target neural network to predict auxiliary information, as well as predict the security recognition task label, a richer set of features can be learnt by the base network than if the multi-target neural network were only trained to predict the security recognition task label.

Preferably, the training unit is further configured to update a configuration associated with the base network and a configuration associated with the security recognition task classification network when optimizing the security recognition task loss function.

Preferably, the training unit is further configured to update a configuration associated with the base network and a configuration associated with the auxiliary information classification network when optimizing the auxiliary information loss function.

Beneficially, the weights associated with the base network are updated both when the weights of the security recognition task classification network are updated and when the weights of the auxiliary information classification network are updated. As such, training the auxiliary information classification network helps to guide training of the security recognition classification network, thereby leading to a more robust and accurate model being learnt.

Preferably, the base network comprises a plurality of dense blocks.

Optionally, each dense block of the plurality of dense blocks comprises a dropout layer, a dense layer, a batch normalization layer, and an activation function.

Beneficially, each dense block is configured to identify a specific class of features within the training data. The presence of a dropout layer and a batch normalization layer helps reduce overfitting and improves the stability and speed of training.

Preferably, the security recognition task classification network comprises at least one dense layer and an activation function.

Preferably, the auxiliary information classification network comprises at least one dense layer and an activation function.

Preferably, the training data comprises a plurality of training samples each of which being associated with a single portable executable file.

Preferably, a training sample of the plurality of training samples comprises one or more features, a security recognition task label, and auxiliary information.

Preferably, the one or more features of the training sample correspond to one or more features extracted from the single portable executable file.

Optionally, the auxiliary information comprises one of a per-authority label or a textual label.

Preferably, the security recognition task comprises recognizing portable executable files as malware.

According to a further aspect of the invention, there is provided a method for conducting a security recognition task. The method comprising providing training data to a model including auxiliary information that will not be available as input to the model when the model is used as a security recognition task model for a security recognition task. The method further comprising training the model, as the security recognition task model, using the training data to predict the auxiliary information as well as to perform the security recognition task, thereby improving performance of the security recognition task. The method further comprising using the security recognition task model output to perform the security recognition task while ignoring the auxiliary attributes in the model output.

Preferably, training the model using the training data further comprises the step of jointly optimizing a security recognition task loss function and an auxiliary information loss function.

Preferably, the model comprises a multi-target neural network comprising a base network, a security recognition task classification network, and an auxiliary information classification network.

Preferably, training the model using the training data further comprises the step of updating a configuration of the base network and a plurality of weights of the security recognition task classification network based on the optimizing of the security recognition task loss function.

Preferably, training the model using the training data further comprises the step of updating a configuration of the base network and a plurality of weights of the auxiliary information classification network based on the optimizing of the auxiliary information loss function.

Preferably, the security recognition task comprises recognizing portable executable files as malware.

According to an additional aspect of the invention there is provided a computer readable medium comprising one or more programs, the one or more programs comprising instructions which when executed by one or more processors of an electronic device cause the electronic device to perform the methods of any one of the above method steps.

In an embodiment, the computer readable medium is a non-transitory storage medium.

BRIEF DESCRIPTION OF DRAWINGS

Embodiments of the invention will now be described, by way of example only, and with reference to the accompanying drawings, in which.

DETAILED DESCRIPTION

Embodiments of the present disclosure will be now described with reference to the attached figures. It is to be noted that the following description is merely used for enabling the skilled person to understand the present disclosure, without any intention to limit the applicability of the present disclosure to other embodiments which could be readily understood and/or envisaged by the reader. In particular, whilst the present disclosure is primarily directed to security recognition tasks, such tasks are not limited to malware detection, and can include behaviour recognition, threat detection, and other related tasks.

The present invention incorporates metadata into the training of a machine learning model for conducting a security task. Metadata is often present at the time of training the machine learning model but is not necessarily available when the machine learning model is deployed. The machine learning model is trained both to predict the data necessary to perform the security recognition task and to predict the metadata in the form of auxiliary information. By incorporating metadata into the training process, a more robust and better performing machine learning model can be trained, as more information is used to determine the trained configuration of the machine learning model. In addition, the present invention enables a richer set of features to be learnt by a machine learning model thereby improving performance. Furthermore, in settings where the machine learning model is used to perform multiple security recognition tasks, the training system of the present invention provides a more compact and efficient system which requires only a single model to be trained, deployed, and maintained, rather than the multiple models required for the multiple security recognition tasks (where at least one model is required per security recognition task).

Figure 1:
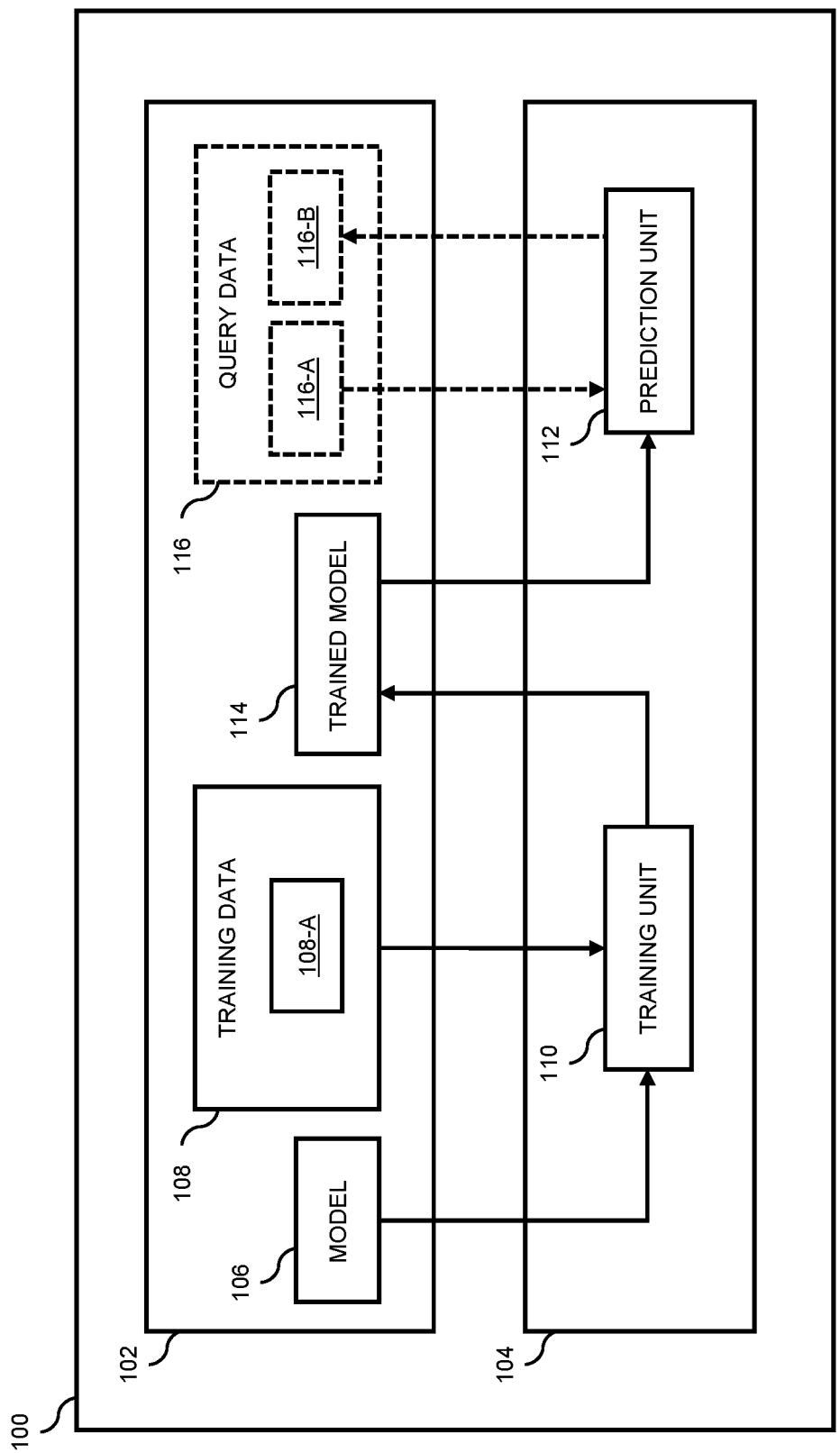
FIG. 1 shows a system for conducting a security recognition task according to an aspect of the invention.

FIG. 1 shows a system for conducting a security recognition task according to an aspect of the present invention.

System 100 comprises memory 102 and one or more processors 104 communicably linked to memory 102. In one embodiment, system 100 is implemented on a single hardware-based computing device such as a compute device, a desktop computing device, or a server device. In an alternative embodiment, the components of the system are distributed across multiple compute devices, for example within a network or as part of a cloud-based service.

One or more processors 104 include a hardware based integrated circuit (IC) or any other suitable processing device configured to run and/or execute a set of instructions or code. Example processors include a general purpose processor, a central processing unit (CPU), an accelerated processing unit (APU), an application specific integrated circuit (ASIC), a field programmable gate array (FPGA), a programmable logical array (PLA), a complex programmable logic device (CPLD), a programmable logic controller (PLC), a graphical processing unit (GPU), a tensor processing unit (TPU), a interconnect processing unit (IPU) and/or the like. Optionally, the one or more processors comprises a combination of processors, for example, the one or more processors can include a CPU and a GPU. One or more processors 104 is communicable coupled to memory 102 through a system bus (e.g., an address bus, control bus, and data bus).

Memory 102 is configured to store model 106 and training data 108. Preferably, memory 102 is a random access memory (RAM). Alternatively, the memory is a memory buffer, a hard-drive, a read-only memory (ROM), an erasable programmable read-only memory (EPROM), and/or the like.

As will be described in more detail with reference to FIGS. 3 to 9, model 106 is a machine learning model configured to receive a sample as input and output a security recognition task prediction and an auxiliary information prediction.

Training data 108 includes auxiliary information 108-A that will not be available as input to the model when the model is used as a security recognition task model for the security recognition task. As will be described in more detail with reference to FIG. 2, auxiliary information 108-A corresponds to metadata which describes aspects of training data 108 that will not necessarily be available to the trained model when the trained model is used for the security recognition task. Including auxiliary information 108-A as part of the training of model 106 leads to a more robust and accurate model being learnt.

Figure 2:
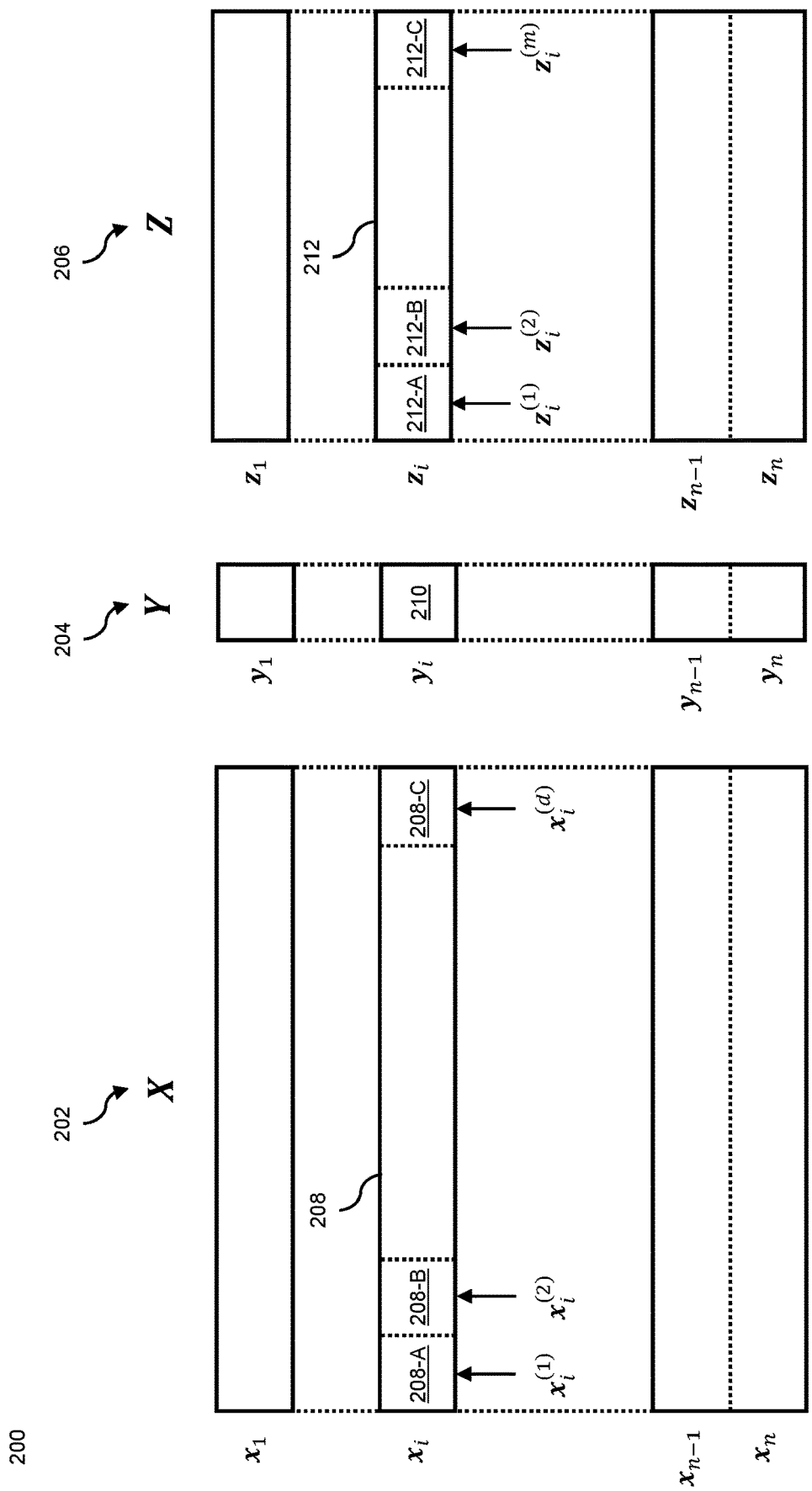
FIG. 2 illustrates the training data shown in FIG. 1.

FIG. 2 illustrates training data 200, which is shown as training data 108 in FIG. 1.

Training data 200 comprises plurality of training samples 202 (X), plurality of security recognition task labels 204 (Y), and plurality of auxiliary information 206 (Z). Plurality of training samples 202 is preferably represented as a matrix comprising n-rows and d-columns, such that $X \in \mathbb{R}^{(n \times d)}$, where each row corresponds to a single training sample and each column corresponds to a feature. Sample 208 ($x_i$) of plurality of training samples 202 is associated with a single portable executable file, and comprises plurality of feature values 208-A, 208-B, 208-C extracted from the single portable executable file.

Preferably, plurality of feature values 208-A, 208-B, 208-C are extracted from the single portable executable file associated with sample 208 by a feature extraction process which converts the static binary file of the single portable executable file to a numerical vector of values. The feature extraction process comprises a numerical transformation that preserves aggregate and fine-grained information throughout each sample. An example of a feature extraction method is provided in Saxe, J., and Berlin, K., *Deep neural network based malware detection using two-dimensional binary program features*, Malicious and Unwanted Software (MALWARE), 10$^{th}$ International Conference (2015), IEEE, pp. 11-20, which is hereby incorporated by reference in its entirety. The feature extraction method in Saxe and Berlin is readily applicable to the present invention and uses windowed byte statistics, 2D histograms of delimited string hash vs. string length, and histograms of hashes of PE-format specific metadata (e.g., imports from the import address table) to convert a single portable executable file to a numerical vector. The skilled person will appreciate that any suitable feature extraction method can be used, and the present disclosure is not intended to be limited to the example given above.

Each sample of plurality of training samples 202 is associated with a security recognition task label value and an auxiliary information value. For example, sample 208 ($x_i$) is associated with security recognition task label 210 ($y_i$) and auxiliary information 212 ($z_i$).

The security recognition task label corresponds to the target to be learnt as a result of training a machine learning model. Therefore, a machine learning model trained on training data 200 will predict a security recognition task label given a query sample, such as query sample 116-A shown in FIG. 1.

In one embodiment, the security recognition task label value is indicative of whether or not the corresponding portable executable files is a security theat. In such an embodiment, each security recognition task label value is binary, where a value of 1 indicates that the corresponding portable executable file is a security threat, and a value of 0 indicates that the corresponding portable executable file is not a security threat. In a further embodiment, the security recognition task label value is indicative of whether or not the corresponding portable executable file is malware or benignware (i.e., not malware). In such an embodiment, the security recognition task label value is binary, where a value of 1 indicates that the corresponding portable executable file is malware, and a value of 0 indicates that the corresponding portable executable file is benignware. Alternatively, the security recognition task label value is indicative of other factors associated with the corresponding portable executable file such as suspiciousness and behaviour based features. In such embodiments, the security recognition task label value can be binary, categorical, or real-valued.

Auxiliary information 212 is preferably a vector comprising plurality of values 212-A, 212-B, 212-C. Alternatively, the auxiliary information value is a single value. The auxiliary information corresponds to metadata associated with the single portable executable file. The metadata is available for training, i.e., it is part of training data 200, but it is not necessarily available once the model has been trained and is being used to conduct a security recognition task.

Preferably, the auxiliary information is gathered from several sources, including deployed anti-malware products and aggregation services. An aggregation service will run a single portable executable file through multiple authority products and provide reports containing per-authority detections and metadata. Here, an authority is considered to be a trusted authority such as a vendor, or service provider, of information security products and software.

Optionally, the auxiliary information value for each of the plurality of portable executable files, associated with plurality of training samples 202 of training data 200, includes a security recognition task score provided on a per-authority basis. For example, if metadata is obtained from V different authorities, then each portable executable file is assigned V different security recognition task scores, each of which being associated with a single authority. As such, the auxiliary information value would include V different security recognition task scores. The security recognition task score provided by each authority is a label indicating whether or not a portable executable file is malicious or benign. In one embodiment, the label provided by each authority is a binary value indicative of whether or not a portable executable file is a security threat. In a further embodiment, the label provided by each authority is a binary value indicative of whether or not a portable executable file is malware or benignware.

Malware generally describes a number of different computer security threats. Examples of portable executable file based malware include Trojans, worms, adware, spyware, and computer viruses. In contrast, benignware generally describes any portable executable file which is not a security threat, and so is not malware. As such, benignware is not malware.

Preferably, the security recognition task label is determined as an aggregate taken across security recognition task scores received from a plurality of authorities. In an embodiment, security recognition task label 210 associated with sample 208 is determined using an assignment function, $\tau(\bullet)$, of the security recognition task scores, $v_i$, received from V different authorities such that $y_i = \tau(v_i)$. Here, the per-authority security recognition task scores $$v_i = \{v_i^{(j)}\}_{j=1}^{V}$$

is a vector of security recognition task scores received from V different authorities, where $v_i^{(1)}$ is the security recognition task score received from the first authority, $v_i^{(2)}$ is the security recognition task score received from the second authority, and so on.

The assignment function, $\tau(\bullet)$, is configured to apply a heuristic criterion to the per-authority security recognition task score $v_i$ in order to determine a security recognition task label based on the number of authorities that identify the associated portable executable file as a security threat. Preferably, the assignment function uses a threshold, t, to determine the security recognition task label such that:

$$y_i = \begin{cases} 1 & \text{if } |v_i > 0| > t \\ 0 & \text{otherwise} \end{cases} \quad (1)$$

Here, $|v_i > 0|$ corresponds to the number of authorities within the per-authority security recognition task score vector $v_i$ which have identified the portable executable file as a security threat (assuming a binary security recognition task score such that 1 indicates a security threat and 0 indicates no security threat). The threshold value is in the range $t \in (0, V)$, and preferably in the range $$t \in \left[\frac{V}{4}, \frac{3V}{4}\right],$$

and more preferably the threshold value is t=0.5.

Optionally, the auxiliary information value for each of the plurality of portable executable files, associated with plurality of training samples 202 of training data 200, includes a binary value indicating the presence of a textual label. A dictionary of T pre-determined textual labels are identified, and the metadata received from each authority is examined to determine whether any of the T textual labels are used to describe a portable executable file associated with a single training sample, such as sample 208. Preferably, the textual labels are related to the security task. In one embodiment, the textual labels are detection names designated to the security threat associated with a portable executable file by the authority. In a further embodiment, the textual labels describe the family and/or variant of the malware associated with a portable executable file.

A textual label, or tag, is a high-level description of the purpose of a given malicious portable executable file. Example tags include, "flooder", "downloader", "dropper", "ransomware", "crypto-miner", "worm", "adware", "spyware", "packed", "file-infector", and "installer". Different authorities may utilise different nomenclature when describing a malicious portable executable file. As such, a textual label, or tag, is preferably determined by parsing the individual textual labels received from each authority. Specifically, in order to determine a dictionary of tags, the individual textual labels received from each authority are parsed to extract the most common tokens present within the textual labels using a globally consistent nomenclature. Alternatively, a subset of the authorities is chosen and the textual labels from the subset of authorities are parsed. The most common tokens present within the textual labels preferably comprises the T most commonly occurring tokens, where T is an integer in the range of 0 to the total number of tokens parsed. Once the most commonly occurring tokens have been identified, a mapping is applied to each token. The mapping uses a manually defined lookup table to map variant names to a common name, thus ensuring a globally consistent nomenclature. For example, a textual label of "xmrig" would be mapped via the lookup table to "crypto-miner" since xmrig is a known crypto-currency mining software. The dictionary is then constructed from the transformed set of T tokens.

Preferably, for V authorities and a dictionary of T predetermined textual labels, the auxiliary information value for each sample includes V×T binary indicator values. Alternatively, for V authorities and a dictionary of T predetermined textual labels, the auxiliary information value for each sample includes T binary indicator values, where a textual label is considered present if at least a pre-determined number of the V authorities have used the textual label to describe the associated personal executable file.

Optionally, the auxiliary information value for each of the plurality of portable executable files, associated with plurality of training samples 202 of training data 200, includes a timestamp indicative of the date and time when the corresponding portable executable file was first encountered by an authority. Beneficially, the timestamp information is used during training in order to ensure that temporal relationships between samples in the training data are maintained. Specifically, the timestamp information is used to ensure that no samples exist in the test data set or validation data set which are temporally inconsistent with samples in the training data set.

As such, and referring once again to FIG. 1, auxiliary information 108-A preferably comprises one of a per-authority label or a textual per-authority label.

FIG. 1 further shows one or more processors 104 comprising training unit 110 and prediction unit 112. Training unit 110 is configured to receive training data 108 and model 106 from memory 102 and subsequently provide training data 108 to model 106. Training unit 110 is further configured to train model 106, as the security recognition task model, using training data 108 to predict the auxiliary information as well as to perform the security recognition task, thereby improving performance of the security recognition task.

Beneficially, model 106 is trained using metadata, available at the time of training but not necessarily available at the time of deployment, to improve the performance of model 106 at undertaking the security recognition task. Such metadata helps introduce auxiliary information to model 106 which can lead to a more robust and feature-rich model being learnt as a result of training.

In one embodiment, training unit 110 is configured to train model 106, as the security recognition task model, by updating model 106. Preferably, training unit 110 is configured to update model 106 over a number of iterations. In an alternative embodiment, training unit 110 is configured to train model 106, as the security recognition task model, by replacing model 106 with a new updated model. Preferably, training unit 110 is configured to replace model 106 with a new updated model over a number of iterations. Whilst the new updated model may be considered a new model, the skilled person will appreciate that it is technically no different to an updated model and the process of training (as performed by training unit 110) covers both updating and replacing model 106.

Prediction unit 112 is configured to use the security recognition task model output to perform the security recognition task while ignoring the auxiliary attributes in the model output. Specifically, prediction unit 112 is configured to receive query sample 116-A of query data 116 and apply query sample 116-A to trained model 114 thereby to determine predicted security recognition task label 116-B and perform the security recognition task.

Preferably, model 106 comprises a multi-target classifier. In contrast to single-target models, multi-target models predict at least two outputs. In the present instance, one of the at least two outputs is associated with the security recognition task and the other of the at least two outputs is associated with the auxiliary information. Optionally, model 106 is an ensemble classifier comprising a plurality of classifiers having shared weights. As an example, the model can comprise a pair of logistic regression classifiers, one for each output, and a base logistic regression classifier configured to receive a data sample as input and provide output to the inputs of the pair of logistic regression classifiers. As the ensemble model is trained, the shared weights are updated by both target classifiers such that improving performance of one of the target classifiers can help to improve performance of the other target classifier by updating the shared weights.

In one embodiment, model 106 is a multi-target neural network, and training unit 110 is configured to train the multi-target neural network.

Whilst the following description is directed to model 106 being a multi-target neural network, the skilled person will readily appreciate that the system described is readily applicable to any gradient boosted classifier ensembles and is not intended to be limited solely to neural networks or multi-target neural networks.

Figure 3:
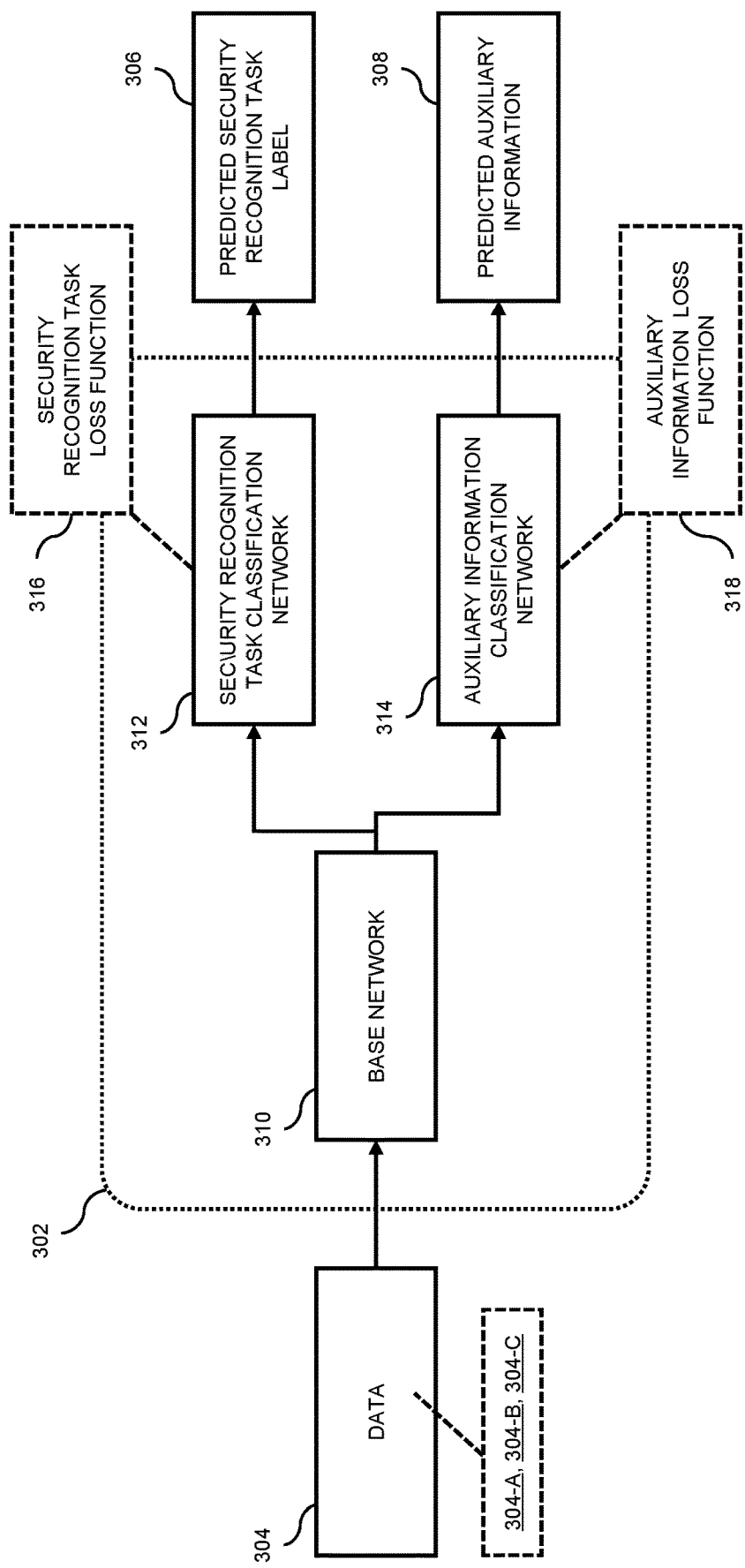
FIG. 3 shows a multi-target neural network which is trained by the training unit of FIG. 1.

FIG. 3 shows multi-target neural network 302 which is trained by training unit 110 of FIG. 1 according to one embodiment.

Multi-target neural network 302, which is an embodiment of model 106 of FIG. 1, is configured to receive data 304 as input, and output predicted security recognition task label 306 and predicted auxiliary information 308.

Data 304 includes sample 304-A which is provided as input to multi-target neural network 302. Data 304 further comprises security recognition task label 304-B and auxiliary information 304-C both associated with sample 304-A. During training of multi-target neural network 302, data 304 is drawn from the training data, such as training data 200 described in relation to FIG. 2.

Multi-target neural network 302 comprises base network 310, security recognition task classification network 312, and auxiliary information classification network 314. Base network 310 is configured to receive sample 304-A, $x_i$, and produce an intermediate output $h_i = f_b(x_i)$. Security recognition task classification network 312, is configured to receive the intermediate output, $h_i$, and produce predicted security recognition task label 306 $f_{sec}(x_i)$. Auxiliary information classification network 314 is configured to receive the intermediate output, $h_i$, and produce predicted auxiliary information 308, $f_{aux}(x_i)$.

As such, base network 310 acts as a feature extraction network for security recognition task classification network 312 and auxiliary information classification network 314. Preferably, the dimensionality of the intermediate output $h_i$ is lower than the dimensionality of sample 304-A $x_i$ such that base network 310 not only performs feature extraction on sample 304-A, but also performs dimensionality reduction on sample 304-A. Thus, base network 310 learns a compact high-dimensional feature representation of sample 304-A during training.

Base network 310 is a feed-forward neural network comprising an input layer, at least one hidden layer, and an output layer. Each layer comprises a plurality of units each of which plurality of units having a plurality of weights associated therewith. Given a base network comprising p weights, a vector of values, $\theta_1 \in \mathbb{R}^p$, for the plurality of weights of the base network is referred to herein as a configuration of the base network. Therefore, base network 310 is a function of the input data received, $x_i$, and the configuration, $\theta_1$, such that $h_i = f_b(x_i, \theta_1)$.

Security recognition task classification network 312 comprises at least one layer and an activation function. The at least one layer comprises a plurality of units each of which plurality of units having a plurality of weights associated therewith. Preferably, the at least one layer is a dense layer, i.e., a densely connected layer. Given a security task classification network comprising q weights, a vector of values, $\theta_2 \in \mathbb{R}^q$, for the plurality of weights of the security task classification network is referred to herein as a configuration of the security task classification network. The activation function is a sigmoid activation function. Alternatively, the activation function is any appropriate activation function which maps the output of the at least one layer to the range [a, b] where a corresponds to the minimum allowable output value, and is preferably a=0, and b corresponds to the maximum allowable output value and is preferably b=1.

Therefore, security recognition task classification network 312 is a function of the intermediate output, $h_i = f_b(x_i, \theta_1)$, and the configuration, $\theta_2$, such that:

$$\hat{y}_i = f_{sec}(f_b(x_i, \theta_1), \theta_2) \quad (2)$$

Here, $\hat{y}_i$ corresponds to predicted security recognition task label 306 for sample 304-A. During training of multi-target neural network 302, predicted security recognition task label 306, $\hat{y}_i$, is compared to security recognition task label 304-B, $y_i$.

Auxiliary information classification network 314 comprises at least one layer and an activation function. The at least one layer comprises a plurality of units each of which plurality of units having a plurality of weights associated therewith. Preferably, the at least one layer is a dense layer, i.e., a densely connected layer. Given an auxiliary information classification network comprising r weights, a vector of values, $\theta_3 \in \mathbb{R}^r$, for the plurality of weights of the auxiliary information classification network is referred to herein as a configuration of the auxiliary information classification network. As will be described in more detail below, the activation function is dependent upon the auxiliary information being predicted by auxiliary information classification network 314.

Therefore, auxiliary information classification network 314 is a function of the intermediate output, $h_i = f_b(x_i, \theta_1)$, and the configuration, $\theta_3$, such that:

$$\hat{z}_i = f_{aux}(f_b(x_i, \theta_1), \theta_3) \quad (3)$$

Here, $\hat{z}_i$ is predicted auxiliary information 308 for sample $x_i$.

According to the present embodiment, training unit 110 of FIG. 1 is configured to update the plurality of weights of multi-target neural network 302 during training. In particular, the plurality of weights associated with base network 310 are updated as a result of training security recognition task classification network 312 and auxiliary information classification network 314. Therefore, training multi-target neural network 302 to predict auxiliary information, via auxiliary information classification network 314, helps to enable base network 310 to learn a richer class of features than if multi-target neural network 302 were trained to predict a security recognition task label alone.

Preferably, training unit 110 is configured to jointly optimize security recognition task loss function 316 and auxiliary information loss function 318. More preferably, training unit 110 is configured to jointly optimize security recognition task loss function 316 and auxiliary information loss function 318 thereby to determine an updated plurality of weights of multi-target neural network 302.

Figure 4:
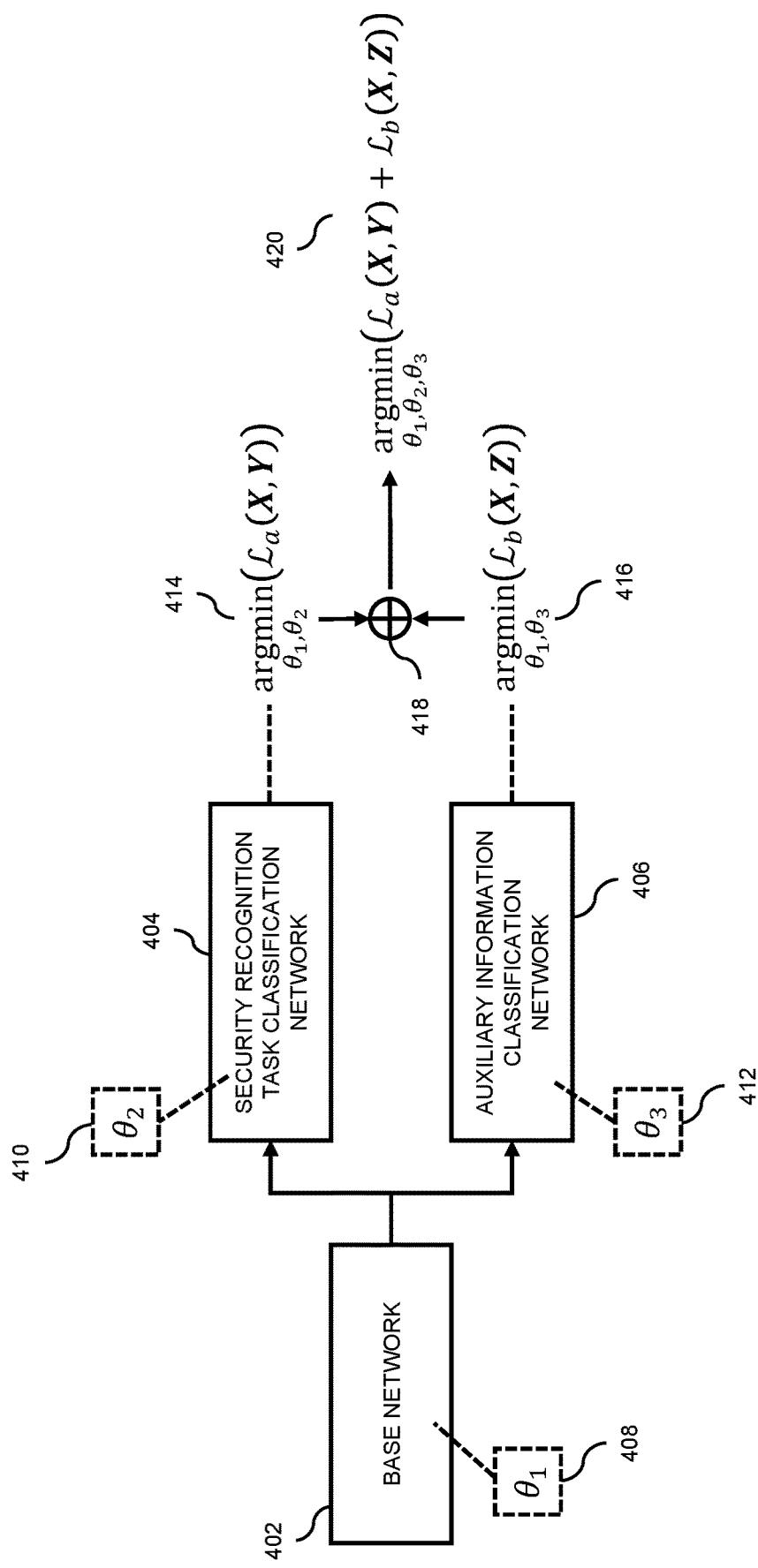
FIG. 4 illustrates the joint optimization process undertaken by the training unit of FIG. 1 when updating the weights of the multi-target neural network shown in FIG. 3.

FIG. 4 illustrates the joint optimization process undertaken by training unit 110 when updating the weights of multi-target neural network 302 during training, according to the present embodiment.

FIG. 4 shows base network 402, security recognition task classification network 404, and auxiliary information classification network 406 which are equivalent to base network 310, security recognition task classification network 312, and auxiliary information classification network 314 of FIG. 3. Base network 402 is associated with configuration 408, $\theta_1$, security recognition task classification network 404 is associated with configuration 410, $\theta_2$, and auxiliary information classification network is associated with configuration 412, $\theta_3$. As stated previously, configurations $\theta_1$, $\theta_2$, $\theta_3$ each comprise a plurality of weight values associated with the plurality of weights of the corresponding network.

FIG. 4 further shows security recognition task optimization problem 414 and auxiliary information optimization problem 416. During training, and with reference to training unit 110 of FIG. 1, training unit 110 is preferably configured to update each configuration based on joint optimization 418 of the security recognition task loss function, $\mathcal{L}_a(X, Y)$, and the auxiliary information loss function, $\mathcal{L}_b(X, Z)$. Optimization of the security recognition task loss function comprises optimization of security recognition task optimization problem 414:

$$\arg\min_{\theta_1, \theta_2} (\mathcal{L}_a(X, Y)) \quad (4)$$

Optimization of the auxiliary information loss function comprises optimization of auxiliary information optimization problem 416:

$$\arg\min_{\theta_1, \theta_3} (\mathcal{L}_b(X, Z)) \quad (5)$$

The optimizations defined in Equations (4) and (5) both comprise optimization of configuration $\theta_1$ as well as optimization of classification network specific configurations $\theta_2$, $\theta_3$. As such, training unit 110 is preferably configured to minimize the joint optimization problem 420:

$$\underset{\theta_1,\theta_2,\theta_3}{\arg\min}(\mathcal{L}_a(X, Y) + \mathcal{L}_b(X, Z)) \quad (6)$$

As such, training unit 110 is preferably configured to update configuration 408 associated with base network 402 and configuration 410 associated with security recognition task classification network 404 when optimizing the security recognition task loss function. Conversely, training unit 110 is preferably configured to update configuration 408 associated with base network 402 and configuration 412 associated with auxiliary information classification network 406 when optimizing the auxiliary information loss function.

Therefore, optimization of the auxiliary information loss function adjusts configuration 408 of base network 402 which is shared by the optimization of the security recognition task loss function. Conversely, optimization of the security recognition task loss function adjusts configuration 408 of base network 402 which is shared by the optimization of the auxiliary information loss function. Consequently, improving the predictive performance of auxiliary information classification network 406 helps improve the predictive performance of security recognition task classification network 404.

Optionally, training unit 110 is configured to assign a first weight to the security recognition task loss function and assign a second weight to the auxiliary information loss function. Preferably, the first weight is greater than the second weight. More preferably, the first weight is 1 and the second weight is 0.1. Beneficially, weighting the different loss functions allows fine grained control over the contribution of each loss function to the joint optimization and ensures that the auxiliary information loss function does not dominate the optimization process which could result in a reduction in the performance of the security recognition task.

Preferably, joint minimization of Equation (4) can be achieved through backpropagation in conjunction with an iterative optimization method such a stochastic gradient descent. Alternatively, an optimizer such as the ADAM optimizer is used with backpropagation to jointly minimize Equation (4). The hyper-parameters required for training can be found using the default values suggested by the optimizer used, or by using a strategy such as grid search, random search, or Bayesian optimization.

Referring again to FIG. 3, multi-target neural network 302 is a flexible framework which allows auxiliary information to be utilised at the time of training to help improve performance of a security recognition task. Whilst only a single auxiliary information classification network is shown in FIG. 3, the present invention describes a framework within which a possible plurality of auxiliary information classifiers can be augmented to a security recognition task classification model to build a more robust, efficient, and accurate model.

A single auxiliary information classification network, such as auxiliary information classification network 316, is configured to predict a single auxiliary information value. Preferably, an auxiliary information value is associated with a specific loss function, which is jointly optimized with a security recognition task loss function in order to determine the trained model (as described above). By defining different loss functions for the different types of auxiliary information being predicted, aspects unique to the different types of auxiliary information can be leveraged during the training process to help efficiently train a more robust model, which captures a richer class of features than a single target model.

Furthermore, multiple auxiliary information classification networks can be used within the same model thereby allowing multiple types of auxiliary information to be incorporated into the training process. Beneficially, a model trained according to this process is able to predict the primary value of interest, namely the security recognition task prediction, but is also able to be used to predict auxiliary information for portable executable files for which there is no metadata available.

Security recognition task loss function 316 uses a binary cross-entropy loss, $\ell_s$, measured between predicted security recognition task label 306, $\hat{y}_i$, and security recognition task label 304-B, $y_i$. In particular, the binary cross-entropy security recognition task loss function across all samples of training data X is defined as:

$$\mathcal{L}_s(X, Y) = \frac{1}{n}\sum_{i=1}^{n}\ell_s(f_{sec}(x_i, y_i)) \quad (7)$$

$$= -\frac{1}{n}\sum_{i=1}^{n}y_i\log(\hat{y}_i) + (1-y_i)\log(1-\hat{y}_i)$$

Alternatively, the security recognition task loss function can be any differentiable loss function such as the sum of squared errors loss function, or the absolute difference loss function which is differentiable for all points where $\ell_s(f_{sec}(x_i, y_i)) \neq 0$.

As stated above, the exact form of auxiliary information loss function 318 is dependent upon the auxiliary information being predicted. Optionally, the auxiliary information predicted is a security recognition task score from an authority, and auxiliary information loss function 318 is a per-authority task score loss function. Alternatively, the auxiliary information predicted is a parameter of a probability model describing the distribution of security recognition task scores from a plurality of authorities, and the auxiliary information loss function 318 is a probability model loss function. Alternatively, the auxiliary information predicted is a tag prediction related to a textual description received from a plurality of authorities, and the auxiliary information loss function is a tag-based loss function.

Whilst each of the descriptions below are restricted to describing a single loss function, the skilled person will appreciate that the loss functions are defined such that they can be jointly optimized, thereby allowing multiple auxiliary information classification networks to be used within a single model.

Per-Authority Task Score Loss Function

Figure 5:
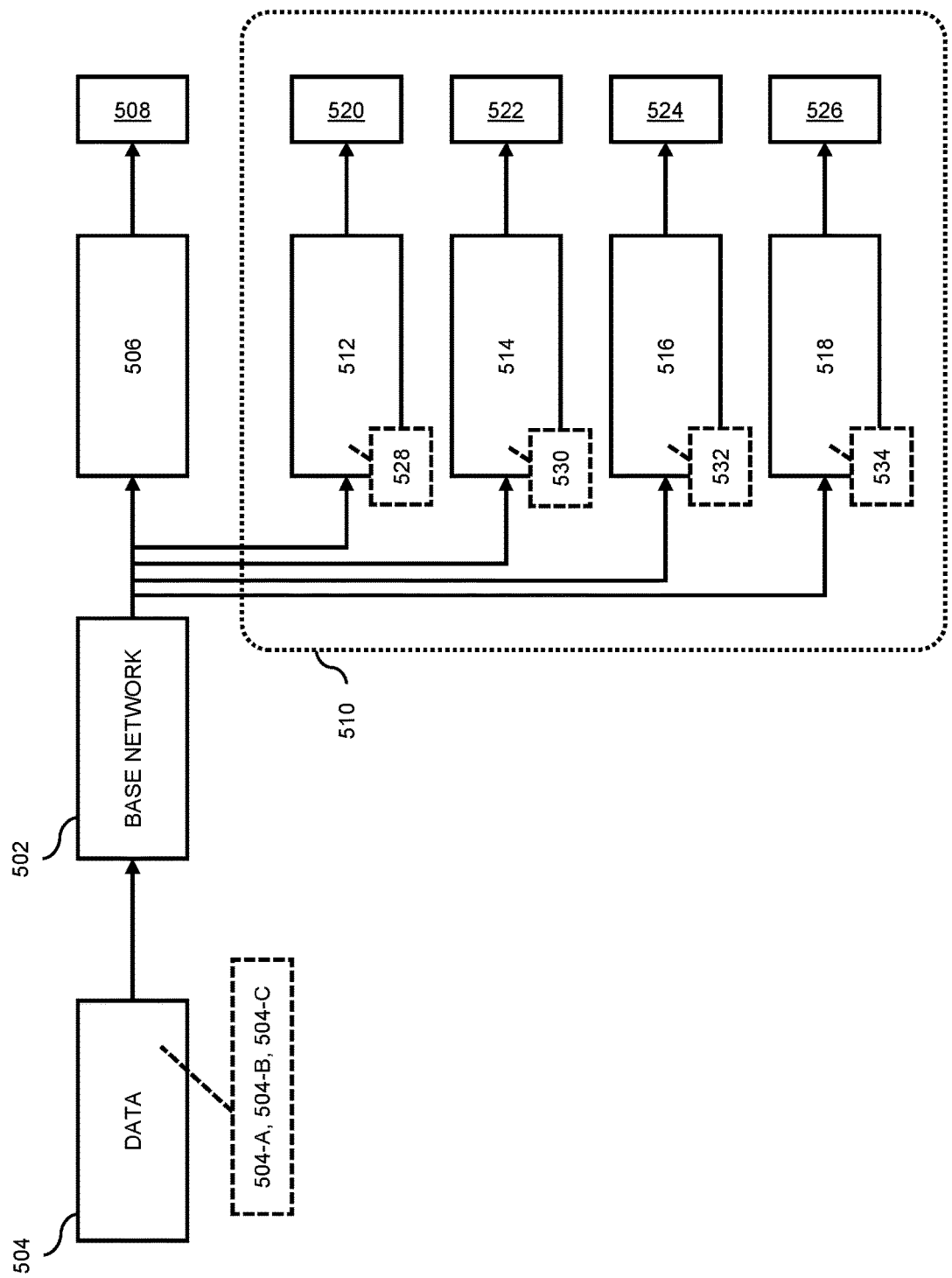
FIG. 5 shows an embodiment of the multi-target neural network shown in FIG. 3 configured to predict auxiliary information corresponding to a plurality of per-authority scores.

FIG. 5 shows an embodiment of multi-target neural network 302 shown in FIG. 3 configured to predict auxiliary information corresponding to a plurality of per-authority scores. As described previously in relation to FIG. 2, an aggregation service will run a single portable executable file through multiple authority products and provide reports containing per-authority detections (i.e., security recognition task specific scores) and metadata. Here, an authority is considered to be a trusted authority such as a vendor, or service provider, of information security products and software.

FIG. 5 shows base network 502, configured to receive data 504, and security recognition task classification network 506 configured to receive the output from base network 502 thereby to determine predicted security recognition task label 508. Data 504 comprises sample 504-A, security recognition task label 504-B, and auxiliary information 504-C. Base network 502, security recognition task classification network 506, and predicted security recognition task label 508 are equivalent to base network 310, security recognition task classification network 312, and predicted security recognition task label 306 shown in FIG. 3.

FIG. 5 further shows plurality of per-authority task score classification networks 510. Each per-authority task score classification network 512, 514, 516, 518 of plurality of per-authority task score classification networks 510 is configured to receive the output from base network 502 thereby to determine corresponding plurality of predicted per-authority task scores 520, 522, 524, 526. Each per-authority task score classification network 512, 514, 516, 518 is configured to be trained using a corresponding per-authority task score loss function 528, 530, 532, 534. As such, per-authority task score classification network 512, predicted per-authority task score 520, and per-authority task score loss function 528 are embodiments of auxiliary information classification network 314, predicted auxiliary information 308, and auxiliary information loss function 318 shown in FIG. 3.

Each per-authority task score classification network 512, 514, 516, 518 is trained to predict a security recognition task score for a single authority. In the example shown in FIG. 4, auxiliary information 504-C includes a vector of four security recognition task scores received from four authorities. As such, each per-authority task score classification network 512, 514, 516, 518 is configured to predict the security recognition task score for one of the four authorities.

By augmenting base network 502 with plurality of per-authority task score classification networks 510 the performance of security recognition task classifier 506 at predicting the security recognition task values can be improved.

Whilst four per-authority task score classification networks are shown in FIG. 5, the skilled person will appreciate that the present invention is not intended to be limited as such. Indeed, the number of per-authority task score classification networks is dependent upon the number of authorities V present in the auxiliary information of the training data used to train the multi-target neural network. Furthermore, the number of per-authority task score classification networks used need not be equal to the total number of authorities present in the auxiliary information of the training data. Indeed, a subset of the total number of authorities can be employed in order to train the multi-target neural network using metadata from a trusted subset of the authorities.

As previously stated, a per-authority task score classification network, such as per-authority task score classification network 512, is trained using a per-authority task score loss function, such as per-authority task score loss function 528. Preferably, the per-authority task score loss function is a binary cross-entropy loss, $\ell_v$, measured between the predicted per-authority task score, $\hat{z}_i^{(j)}$, and the actual per-authority security recognition task score $z_i^{(j)}$.

Preferably, plurality of per-authority task score classification networks 510 are trained through joint optimization of the security recognition task classification network loss function (not shown) and the plurality of per-authority task score loss functions 528, 530, 532, 534. More preferably, an aggregate loss function is used to train plurality of per-authority task score classification networks 510.

Preferably, the aggregate loss function across all n training data samples and all V authorities is a multi-label binary cross-entropy loss function defined as:

$$\mathcal{L}_v(X, Z) = \frac{1}{n} \sum_{i=1}^{n} \left( \sum_{j=1}^{V} \ell_v(f_v(x_i), z_i^{(j)}) \right) \quad (8)$$

$$= -\frac{1}{n} \sum_{i=1}^{n} \left( \sum_{j=1}^{V} z_i^{(j)} \log\left(\hat{z}_i^{(j)}\right) + \left(1 - z_i^{(j)}\right) \log\left(1 - \hat{z}_i^{(j)}\right) \right)$$

Here, $f_v(x_i)$ corresponds to the prediction produced from a single per-authority task score classification network, such as predicted per-authority task score 520.

Optionally, the contribution of each per-authority task score classification network 512, 514, 516, 518 to the aggregate loss function described in Equation (8) is learnt and adjusted as part of the training process. Beneficially, this allows the model to learn which authorities should be trusted and relied upon when predicting the security recognition task value, and which authorities should be ignored. Preferably, a learnable weight is applied to the output of a task score classification network, such as per-authority task score classification network 512. More preferably, a task score classification network, such as per-authority task score classification network 512, comprises an output unit configured to receive the outputs of the dense layer as input and provide output to the activation function. The weights associated with the output unit form a part of the configuration of per-authority task score classification network 512 and so can be updated and learnt during training.

Count Probability Loss Function

Figure 6:
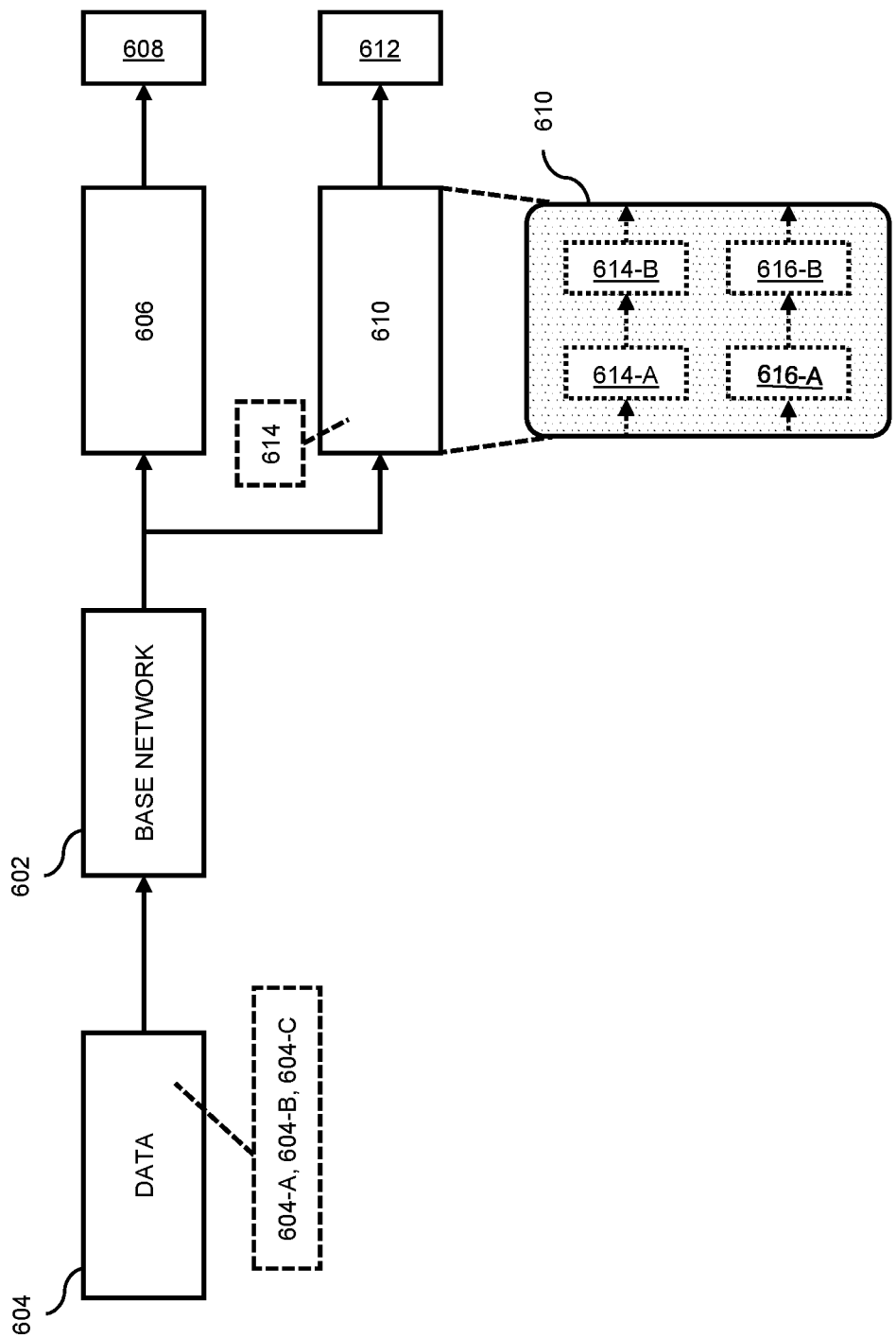
FIG. 6 shows an embodiment of the multi-target neural network shown in FIG. 3 configured to predict auxiliary information corresponding to a parameter of a probability model.

FIG. 6 shows an embodiment of multi-target neural network 302 shown in FIG. 3 configured to predict auxiliary information corresponding to a parameter of a probability model.

FIG. 6 shows base network 602, configured to receive data 604, and security recognition task classification network 606 configured to receive the output from base network 602 thereby to determine predicted security recognition task label 608. Data 604 comprises sample 604-A, security recognition task label 604-B, and auxiliary information 604-C. Base network 602, security recognition task classification network 606, and predicted security recognition task label 608 are equivalent to base network 310, security recognition task classification network 312, and predicted security recognition task label 306 shown in FIG. 3.

FIG. 6 further shows count probability network 610 configured to receive the output from base network 602 thereby to determine predicted count probability 612. Count probability network 610 is configured to be trained using count probability loss function 614. As such, count probability network 610, predicted count probability 612, and count probability function 614 are embodiments of auxiliary information classification network 314, predicted auxiliary information 308, and auxiliary information loss function 318 shown in FIG. 3.

As described in relation to FIG. 5, a single per-authority task score classification network is configured to predict a task score for a single authority of a plurality of authorities, and the task scores for the plurality of authorities can be predicted within a single model by augmenting the model with a corresponding plurality of per-authority task score classification networks.

In contrast to the embodiment of FIG. 5, count probability network 610 learns a parameter of a probability density function describing the number of authorities which identify a given portable executable file as a security threat. Specifically, count probability network 610 learns a parameter, $\mu_i$, of the conditional probability $P(z_i|\mu_i)$, where $z_i$ corresponds to the total number of authorities that identify the portable executable file associated with sample $x_i$ as being a security threat. Preferably, the conditional probability is a probability density function of a discrete probability distribution.

Since count probability network 610 is learning a parameter of a distribution, and not a label, an activation function, $\alpha(\cdot)$, is augmented to the output, $f_p(x_i)$, of count probability network 610 such that the output of count probability network 610 becomes $\alpha(f_p(x_i))$. Activation function, $\alpha(\cdot)$, maps the output of count probability network 610 to the positive real numbers, i.e., $\alpha(f_p(x_i)) \in \mathbb{R}^+$. Therefore, the parameter, $\mu_i$, of the conditional probability $P(z_i|\mu_i)$ can be written as $\mu_i = \alpha(f_p(x_i))$ and represents the predicted number of authorities identifying the portable executable file as a security threat. Preferably, the activation function is an exponential function. Alternatively, the activation function is any other suitable function such as a Rectified Linear Unit (ReLU).

The probability density function is that of a Poisson distribution such that:

$$P(z_i|\mu_i) = \frac{(\mu_i)^{z_i} e^{-\mu_i}}{z_i!} \tag{9}$$

Beneficially, the Poisson distribution is discrete and the assumption of increased variance with predicted mean ($\mu_i$) is more accurate than a homoscedastic model. Alternatively, the probability density function is any appropriate discrete probability distribution, such as the Bernoulli distribution, the geometric distribution, and the binomial distribution.

As previously stated, count probability network 610 is trained using count probability loss function 614. Preferably, count probability loss function 614 is a negative log-likelihood, $\ell_p$, taken between the predicted parameter, $\mu_i$, which corresponds to the predicted number of authorities identifying the portable executable file as a security threat, and the actual number of authorities identifying the portable executable file as a security threat $z_i$. Note that minimization of the negative log-likelihood, $\ell_p$, is equivalent to a maximization of the likelihood $z_i|\mu_i$.

The negative log-likelihood loss over all n samples in the training data is:

$$\mathcal{L}_p(X, Z) = \frac{1}{n}\sum_{i=1}^{n} \ell_p(\alpha(f_p(x_i)), z_i) \tag{10}$$

$$= \frac{1}{n}\sum_{i=1}^{n} \mu_i - z_i \log(\mu_i) + \log(z_i!)$$

Here, $\alpha(f_p(x_i))$ corresponds to predicted count probability 612 produced from count probability network 610 and is equal to $\mu_i$. Preferably, the term $\log(z_i!)$ is ignored during optimization as it is a constant value which does not depend on the weights of the network.

The Poisson loss defined in Equation (10) is more intuitive than other loss functions when modelling the total number of authorities that identify a portable executable file as a security threat. However, due to correlations between the security recognition task scores received from different vendors, the above described totals do not necessarily follow a Poisson process perfectly. For example, correlations can exist between authority scores due to cross-licencing of authority software products amongst different authorities.

Therefore, in one embodiment, count probability network 610 adapts the probability density function learnt in order to accommodate dispersions in the variance of the total number of authorities that identify a portable executable file as a security threat. Specifically, count probability network 610 learns the parameters of a Restricted Generalized Poisson (RGP) distribution. Given a dispersion parameter, $\beta_i$, Equation (8) for an RGP becomes:

$$P(z_i|\mu_i, \beta_i) = \frac{\left(\frac{\mu_i}{1+\beta_i\mu_i}\right)^{z_i}(1+\beta_i z_i)^{z_i}\exp\left(-\frac{\mu_i(1+\beta_i z_i)}{1+\beta_i\mu_i}\right)}{z_i!} \tag{11}$$

When $\beta_i=0$, then Equation (11) collapses to Equation (8). A value of $\beta_i>0$ accounts for over-dispersion, and a value of $\beta_i<0$ accounts for under-dispersion. Dispersion parameter $\beta_i$ is learnt as part of training count probability network 610 by applying the output of count probability network 610 to an appropriate activation function, $\sigma(\cdot)$, such that $\beta_i = \sigma(f_p(x_i))$. Specifically, in one embodiment count probability network 610 preferably comprises first dense layer 614-A connected to activation function 614-B $\alpha(\cdot)$ in order to predict $\mu_i = \alpha(f_p(x_i))$, and second separate dense layer 616-A connected to activation function 616-B $\sigma(\cdot)$ in order to predict $\beta_i = \sigma(f_p(x_i))$.

As above, count probability loss function 614 is a negative log-likelihood, $\ell_p$, taken between the predicted parameter, $\mu_i$, which corresponds to the predicted number of authorities identifying the portable executable file as a security threat, and the actual number of authorities identifying the portable executable file as a security threat $z_i$. The negative log-likelihood loss over all n samples in the training data is:

$$\mathcal{L}_{gp}(X, Z) = \tag{12}$$

$$-\frac{1}{n}\sum_{i=1}^{n}\left[z_i(\log\mu_i - \log(1+\beta_i\mu_i)) + (z_i-1)\log(1+\beta_i z_i) - \frac{\mu_i(1+\beta_i z_i)}{1+\beta_i\mu_i}\right]$$

In order to ensure that the arguments of the logarithm terms are always positive, activation function 616-B $\sigma(\cdot)$ is chosen such that $\beta_i$ is always positive. Preferably, activation function 616-B $\sigma(\cdot)$ is an exponential function. Alternatively, the activation function is any other suitable function such as RELU.

Beneficially, the use of the RGP loss function of Equation (12) provides a more efficient training methodology as the loss function converges faster than the Poisson loss of Equation (10) and so fewer iterations are required for the RGP loss function to reach an optimal value.

Tag-Based Loss Function

Figure 7:
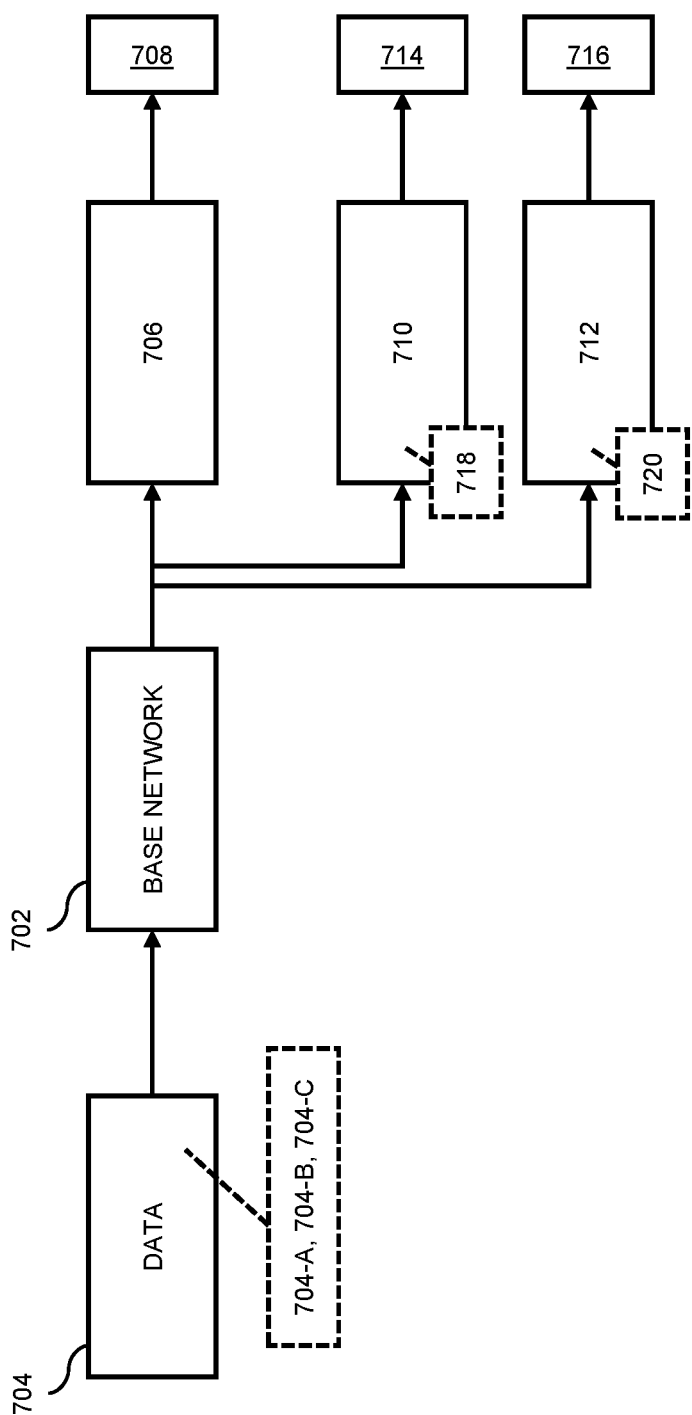
FIG. 7 shows an embodiment of the multi-target neural network shown in FIG. 3 configured to predict auxiliary information corresponding to textual labels, or tags.

FIG. 7 shows an embodiment of multi-target neural network 302 shown in FIG. 3 configured to predict auxiliary information corresponding to the presence of textual labels, or tags.

FIG. 7 shows base network 702, configured to receive data 704, and security recognition task classification network 706 configured to receive the output from base network 702 thereby to determine predicted security recognition task label 708. Data 704 comprises sample 704-A, security recognition task label 704-B, and auxiliary information 704-C. Base network 702, security recognition task classification network 706, and predicted security recognition task label 708 are equivalent to base network 310, security recognition task classification network 312, and predicted security recognition task label 306 shown in FIG. 3.

FIG. 7 further shows tag classification network 710 and tag classification network 712 both configured to receive output from base network 702, thereby to determine predicted tag presence 714, and predicted tag presence 716 respectively. Tag classification network 710 is configured to be trained using tag loss function 718 and tag classification network 712 is configured to be trained using tag loss function 720. As such, tag classification network 710, predicted tag presence 714, and tag loss function 718 are embodiments of auxiliary information classification network 314, predicted auxiliary information 308, and auxiliary information loss function 318 shown in FIG. 3.

Each tag classification network 710, 712 is configured to predict the association of a portable executable file with a pre-determined textual label. For example, a training sample in the training data can comprise auxiliary information which includes a vector of T binary values indicative of whether the associated portable executable file has been described by any of the authorities using a pre-determined dictionary of T textual labels. Examples of such textual labels include high-level descriptive terms such as "flooder", "downloader", "dropper", "crypto-miner". Continuing the previous example, given a dictionary $\psi$ containing two textual labels $\psi=\{t_1, t_2\}$, if an authority uses textual label $t_1$ in any metadata describing a portable executable file, then the auxiliary information value associated with the portable executable file would include the vector binary values {1, 0} (assuming that no authority referred to the portable executable file using textual label $t_2$). In this example, if an authority did refer to the portable executable file using textual label $t_2$ then the auxiliary information value associated with the portable executable file would include the vector binary values {1, 1}.

Each tag classification network 710, 712 comprises two dense fully connected layers. Preferably, the first fully connected layer comprises 512 input units and 256 output units, and the second fully connected layer comprises 256 input units and 1 output unit. Alternatively, each tag classification network 710, 712 comprises one dense layer, or a plurality of dense layers.

A tag loss function, such as tag loss function 718, is a binary cross-entropy loss, $\ell_t$, measured between the predicted tag indicator, $\hat{z}_i^{(j)}$, and the actual tag indicator $z_i^{(j)}$.

Preferably, tag classification networks 710, 712 are trained through joint optimization of the security recognition task loss function (not shown) and tag loss functions 718, 720. More preferably, an aggregate loss function is used to train tag classification networks 710, 712.

The aggregate loss function across all n training data samples and all T tags is a multi-label binary cross-entropy loss function defined as:

$$\mathcal{L}_T(X, Z) = \frac{1}{n}\sum_{i=1}^{n}\left(\sum_{j=1}^{T}\ell_t\left(f_t(x_i), z_i^{(j)}\right)\right) \quad (13)$$

$$= -\frac{1}{n}\sum_{i=1}^{n}\left(\sum_{j=1}^{T}z_i^{(j)}\log\left(\hat{z}_i^{(j)}\right) + \left(1 - z_i^{(j)}\right)\log\left(1 - \hat{z}_i^{(j)}\right)\right)$$

Here, $f_v(x_i)$ corresponds to the prediction produced from a tag network, such as predicted tag presence 714.

Optionally, the contribution of each tag classification network 710, 712 to the aggregate loss function described in Equation (13) is learnt and adjusted as part of the training process. Beneficially, this allows the model to learn which tags provide the most relevant information when seeking to predict the security recognition task value. Preferably, a learnable weight is applied to the output of a tag classification network, such as tag classification network 710. More preferably, a tag classification network, such as tag classification network 712, comprises an output unit configured to receive the outputs of the dense layer as input and provide output to the activation function. The weights associated with the output unit form a part of the configuration of tag classification network 712 and so can be updated and learnt during training.

Tag-based models, such as that described in relation to FIG. 7, provide an effective way of improving the training of a security recognition task network with respect to specific types of security threat. As a motivating example, consider a multi-target neural network model trained for the specific security task of identifying portable executable files as malicious with a particular requirement that ransomware and spyware threats are identified. The model is trained on a training data set which includes samples extracted from portable executable files which are tagged by authorities as ransomware, spyware, and a number of other high-level tags (e.g., adware, installer, crypto-miner, etc.). By augmenting the base classification model with a pair of tag classification networks, one for predicting the presence of a ransomware tag and one for predicting the presence of a spyware tag, the security recognition task performance is improved with respect to identifying ransomware and spyware.

Furthermore, the use of tag-based models help to uncover hidden patterns within the training data which can help to identify novel security threats. Specifically, as the tag-based metadata is not related to the value being predicted for the security recognition task, it can help to direct training of the machine learning model to identify novel features. For example, if a portable executable file associated with a sample in the training data has been assigned a security recognition task label indicating that the portable executable file is benign, but two of the trusted authorities have provided metadata indicating that the portable executable file is from the "WannaCry" family, then the tag-based model described above is able to utilise this metadata when training the model and so potentially learn novel features and patterns beneficial to the performance of the security recognition task. In contrast, if the model were trained solely on metadata directly correlated to the security recognition task label being predicted, then such novel patterns would be less likely to be learnt.

The skilled person will appreciate that the above framework described in relation to FIGS. 3 to 7 is readily applicable to any appropriate ensemble of machine learning models, and in particular is readily applicable to any appropriate neural network architecture. Indeed, the above described embodiments provide a flexible framework for performing a security recognition task whereby different neural network architectures can be augmented to include metadata as part of the training process. This beneficially allows metadata not present when the trained model is deployed to be leveraged during the training process to improve performance of the trained model at conducting a security recognition task.

Furthermore, the above described framework allows for compact models to be trained by training a single model to perform multiple security recognition tasks. As an example, a multi-target model can be trained to predict both the security recognition task label and a textual label associated with the portable executable file. Once deployed, the trained model can perform the security recognition task whilst also providing predicted metadata related to a portable executable file (but which is not available for the portable executable file at the time of deployment). This therefore provides a more efficient classification framework as a single model can be trained, deployed, and updated, as opposed to training, deploying, and updating multiple models for multiple security related tasks.

Figure 8:
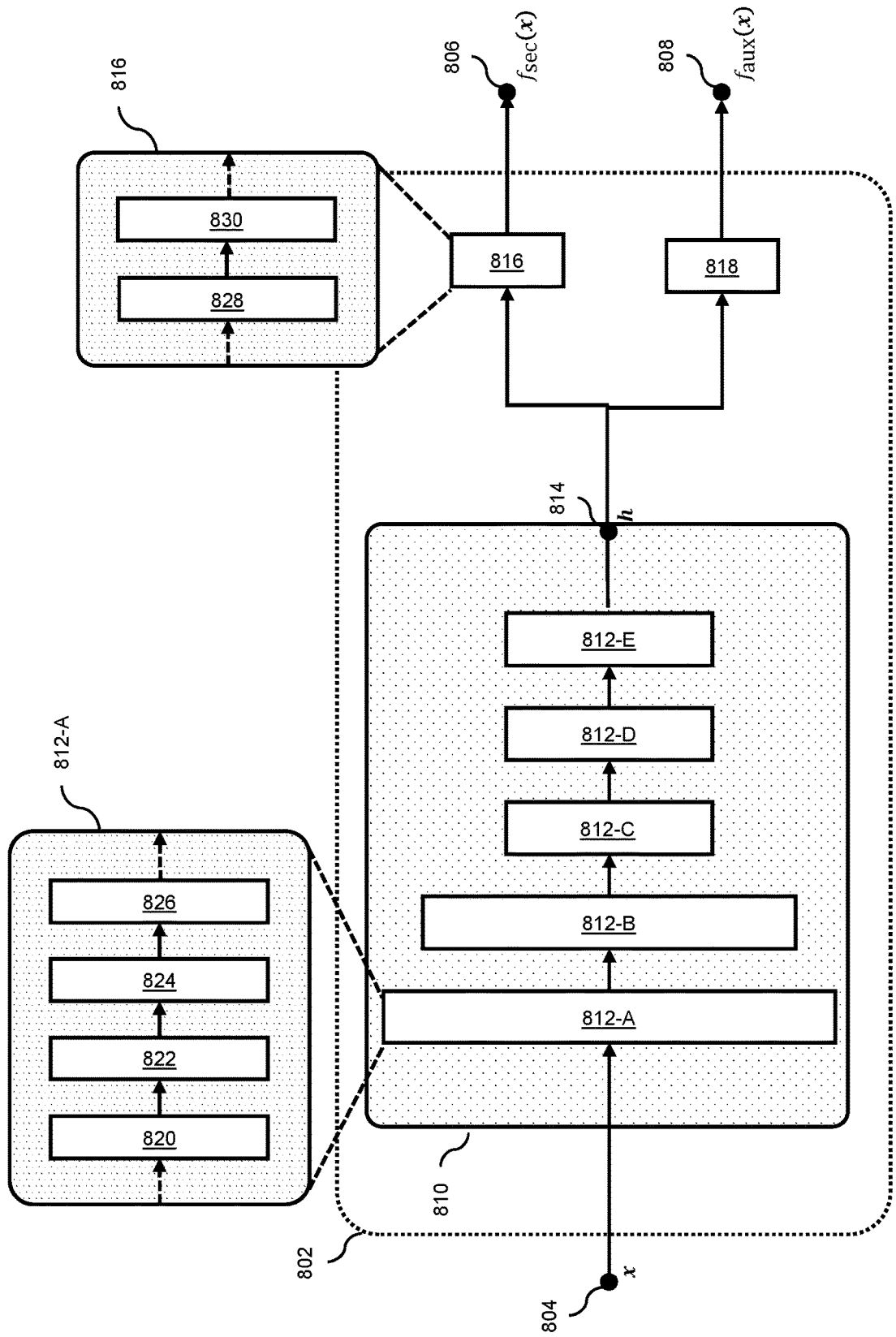
FIG. 8 shows an embodiment of the multi-target neural network shown in FIG. 3.
Figure 9:
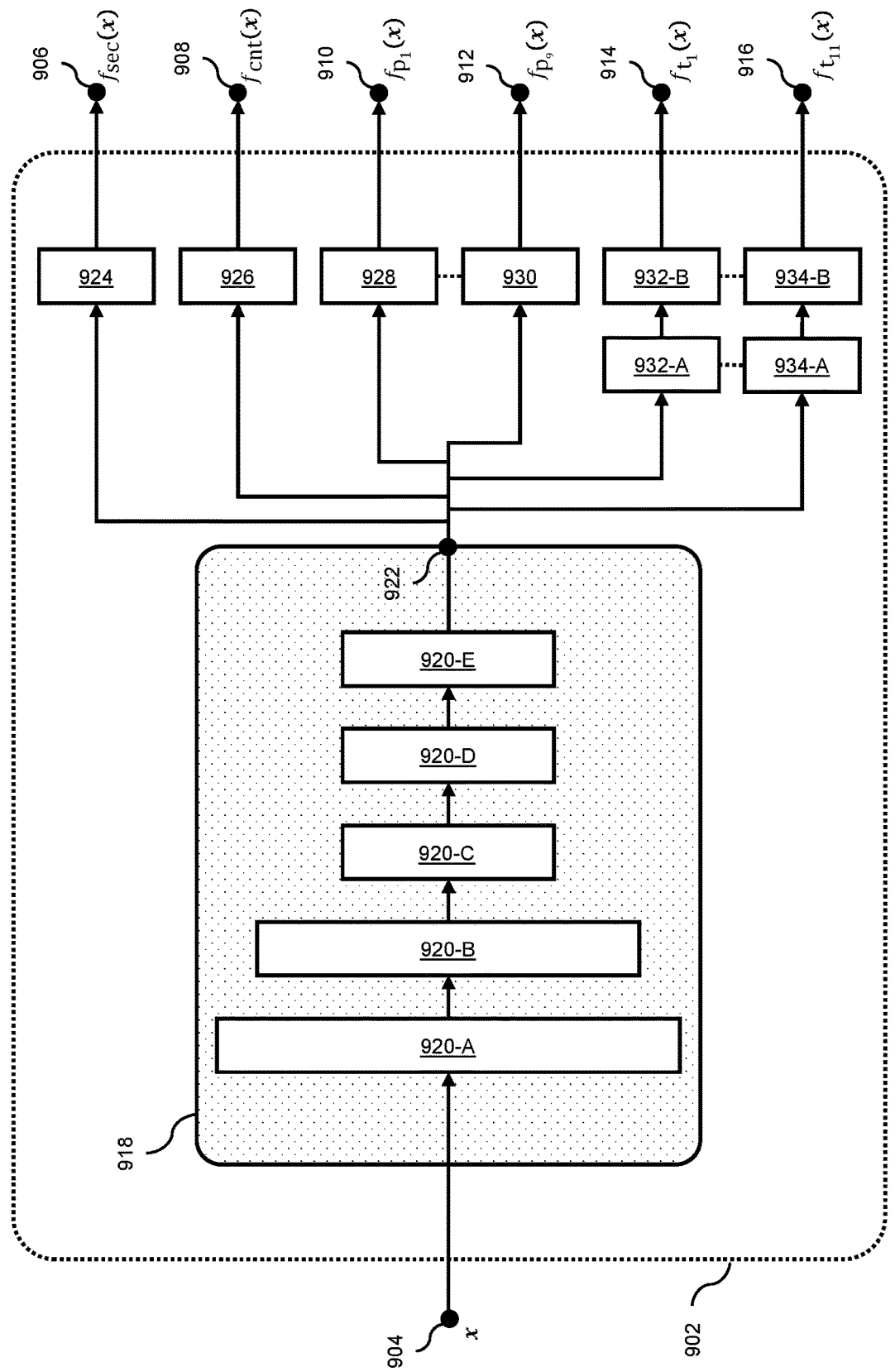
FIG. 9 shows a further embodiment of the multi-target neural network shown in FIG. 3.

Whilst the above described embodiments are indeed applicable to any suitable neural network architecture, FIG. 8 and FIG. 9 illustrate two embodiments of a multi-target deep neural network for conducting a security recognition task.

FIG. 8 shows a further embodiment of multi-target neural network 302 which can be trained by training unit 110 of FIG. 1.

FIG. 8 shows multi-target deep neural network 802, which is an embodiment of multi-target neural network 302 of FIG. 3. Multi-target deep neural network 802 is configured to receive sample 804 as input, and output predicted security recognition task label 806 and predicted auxiliary information 808.

Multi-target deep neural network 802 further comprises base network 810, security recognition task classification network 816 and auxiliary information classification network 818. Base network 810 is configured to receive sample 804 and output intermediate output 814. Security recognition task classification network 816 is configured to receive intermediate output 814 and output predicted security recognition task label 806. Auxiliary information classification network 818 is configured to receive intermediate output 814 and output predicted auxiliary information 808.

Base network 810 is a feed-forward neural network comprising plurality of dense blocks 812-A, 812-B, 812-C, 812-D, 812-E. The input of dense block 812-A is sample 804 and the output of dense block 812-E is intermediate output 814. As is known, the output of each dense block is fed as input to its proceeding dense block. For example, the output of dense block 812-A is fed as input to dense block 812-B and the output of dense block 812-B is fed as input to dense block 812-C.

Each dense block of plurality of dense blocks 812-A, 812-B, 812-C, 812-D, 812-E comprises a plurality of hidden units. Preferably, the number of hidden units in earlier dense blocks is greater than the number of hidden units in later dense blocks. For example, the number of hidden units in dense block 812-A is preferably greater than the number of hidden units in dense block 812-B. More preferably, dense block 812-A comprises 1024 hidden units, dense block 812-B comprises 768 hidden units, and dense blocks 812-C, 812-D, 812-E each comprise 512 hidden units.

Each dense block, such as dense block 812-A, comprises dropout layer 820, dense layer 822, batch normalization layer 824, and activation function 826. The input to dense block 812-A is connected to the input of dropout layer 820, the output of dropout layer 820 is connected to the input of dense layer 822, the output of dense layer 822 is connected to the input of batch normalization layer 824, and the output of batch normalization layer 824 is fed as input to activation function 826. The output of dense block 812-A is the output of activation function 826. Preferably, the dimensionality of the output of dense block 812-A is equal to the number of units in dense layer 822. The skilled person will appreciate that the process described in relation to dense block 812-A is in no way intended to be limiting, and other topologies and ordering of layers fall within the scope of the present invention.

Dropout layer 820 is configured to reduce overfitting of dense layer 822 by acting as a regularizer during training. Specifically, dropout layer 820 is configured to perform element-wise multiplication of the input to the dense block with a random matrix drawn from a Bernoulli distribution. As such, dropout layer 820 removes the contribution of a subset of the plurality of units forming part of the dense block during a single training step. The dropout rate is set at the start of training and is applied globally to each dense block 812-A, 812-B, 812-C, 812-D, 812-E. Preferably, the dropout rate is set to a value in the range of 0 to 0.5, more preferably to a value in the range of 0.1 to 0.4 and more preferably again to a value of 0.25.

Dense layer 822 comprises a plurality of densely connected units. The number of units forming dense layer 822 determines the dimensionality of dense block 812-A. For example, if dense layer 822 comprises 1,024 densely connected units, then the dimensionality of the output of dense block 812-A is equal to 1,024.

Batch normalization layer 824 is configured to scale the output of dense layer 822 to have zero mean and unit variance. Beneficially, batch normalization layer 824 improves the stability and speed of training dense block 812-A.

Activation function 826 is an exponential linear unit (ELU) activation. Alternatively, activation function 826 is a rectified linear unit (RELU), sigmoid, or hyperbolic tangent activation.

As such, base network 810 acts as a feature extraction network outputting intermediate output 814 (which is a compact high-dimensional representation of sample 804). Intermediate output 814 is used as input to security recognition task classification network 816 and auxiliary information classification network 818.

Security recognition task classification network 816 comprises dense layer 828 and activation function 830. Alternatively, the security recognition task classification network comprises a plurality of dense layers and an activation function. Security recognition task classification network 816 estimates the probability that the portable executable file associated with sample 804 is a security threat. In one embodiment, security recognition task classification network 816 estimates the probability that the portable executable file associated with sample 804 is malware.

Activation function 830 is a sigmoid activation which restricts the output to a real value in the range [0, 1]. Alternatively, activation 830 is a stepwise function configured to provide an output of either 0 or 1.

Auxiliary information classification network 818 comprises a dense layer and an activation function. Alternatively, the auxiliary information classification network comprises a plurality of dense layers and an activation function. In some embodiments, the auxiliary classification network comprises two separate dense layers connected to two separate activation functions. In such embodiments, the auxiliary classification network produces two outputs, one for each activation function. Alternatively, the auxiliary classification network uses a suitable function, such as a softmax function, to combine the outputs of the two activation functions in order to determine an output.

Auxiliary information classification network 818 outputs predicted auxiliary information 808. As was described in the foregoing, the exact structure of auxiliary information classification network 818 and the auxiliary information loss function is dependent upon the auxiliary information being predicted. For example, if auxiliary information classification network 818 is configured to predict auxiliary information corresponding to an authority count probability, then auxiliary information classification network 818 preferably comprises two separate dense layers and two corresponding separate activation functions.

Multi-target deep neural network 802 is trained by training unit 110 of FIG. 1 by jointly optimizing the security recognition task loss function ($\mathcal{L}_s$) and the auxiliary information loss function ($\mathcal{L}_a$). The security recognition task loss function is assigned a weight of 1.0 as part of the joint optimization and the auxiliary information loss function is assigned a weight of 0.1 as part of the joint optimization. Specifically, training unit 110 is configured to minimize the following aggregate loss function in order to train multi-target deep neural network 802:

$$L(X,Y,Z) = \mathcal{L}_s(X,Y) + 0.1(\mathcal{L}_a(X,Z)) \tag{14}$$

Equation (14) is minimized is through backpropagation in conjunction with an ADAM optimizer. The hyper-parameters required for training can be found using the default values suggested by the optimizer used, or by using a strategy such as grid search, random search, or Bayesian optimization.

FIG. 9 shows a further embodiment of multi-target neural network 302 which can be trained by training unit 110 of FIG. 1.

FIG. 9 shows multi-target deep neural network 902, which is an embodiment of multi-target neural network 302 of FIG. 3. Multi-target deep neural network 902 is configured to receive sample 904 and output predicted security recognition task label 906 along with plurality of predicted auxiliary information 908, 910, 912, 914, 916.

Multi-target deep neural network 902 comprises base network 918 configured to receive sample 904 and produce intermediate output 922. Base network 918 comprises plurality of dense blocks 920-A, 920-B, 920-C, 920-D, 920-E. Base network 918 preferably has the same topology and structure as base network 810 shown in FIG. 8 and described in detail above.

FIG. 9 further shows security recognition task classification network 924 and auxiliary information classification networks 926, 928, 930, 932-A, 932-B, 934-A, 934-B. Security recognition task classification network 924 has the same topology and structure as security recognition task classification network 816 shown in FIG. 8 and describe in detail above.

Auxiliary information classification network 926 is configured to receive intermediate output 922 and produce predicted auxiliary information 908, which is a count probability prediction. As such, auxiliary information classification network 926 is an embodiment of count probability network 610 of FIG. 6. Auxiliary information classification network 926 is configured to predict a parameter of a probability density function describing the number of authorities which identify a given portable executable file as a security threat. Auxiliary information classification network 926 includes a dense layer comprising 512 fully connected units connected to an exponential activation function. Auxiliary information classification network 926 is trained using the binary cross entropy loss defined in Equation (10).

Auxiliary information classification networks 928, 930 are configured to receive intermediate output 922 and produce corresponding predicted auxiliary information 910, 912 which are predicted per-authority task scores. As such, auxiliary information classification networks 928, 930 are embodiments of per-authority task score classification networks 512, 514 shown in FIG. 5. Auxiliary information classification networks 928, 930 are a subset of a stack of nine per-authority task score classification networks configured to predict nine per-authority task scores (the remaining seven per-authority task score classification networks are omitted from FIG. 9 for brevity). Each of the per-authority task score classification networks includes a dense layer comprising 512 fully connected units connected to a sigmoid activation function. The stack of nine per-authority task score classification networks are trained using the aggregate binary cross-entropy loss function defined in Equation (8).

Auxiliary information classification network 932-A, 932-B and auxiliary information classification network 934-A, 934-B are configured to receive intermediate output 922 and produce corresponding predicted auxiliary information 914, 916. Both predicted auxiliary information 914 and predicted auxiliary information 916 correspond to a predicted tag presence. As such, auxiliary information classification network 932-A, 932-B and auxiliary information classification network 934-A, 934-B are embodiments of tag classification network 710 of FIG. 7 and tag classification network 712 of FIG. 7 respectively. Auxiliary information classification network 932-A, 932-B and auxiliary information classification network 934-A, 934-B are a subset of a stack of eleven tag classification networks configured to predict the presence of eleven tags (the remaining nine tag classification networks are omitted from FIG. 9 for brevity). Specifically, the stack of eleven tag classification networks is configured to predict the presence of the tags: "flooder", "downloader", "dropper", "ransomware", "crypto-miner", "worm", "adware", "spyware", "packed", "file-infector", and "installer". Each of the tag classification networks includes a first dense layer (e.g., 932-A) comprising 512 fully connected units connected to a second dense layer (e.g., 932-B), the second dense layer comprising 256 fully connected units fed to a sigmoid activation function. The stack of eleven per-authority task score classification networks are trained using the multi-label binary cross-entropy loss function defined in Equation (13).

Given the security recognition task classification network and the 21 auxiliary classification networks (each having a corresponding loss function, $\mathcal{L}_k$), training unit 110 is configured to minimize the following aggregate loss function in order to train multi-target deep neural network 902:

$$L(X, Y, Z) = \mathcal{L}_s(X, Y) + 0.1 \sum_{k=1}^{21} \mathcal{L}_k(X, Z) \tag{15}$$

Equation (15) is minimized is through backpropagation in conjunction with an ADAM optimizer. The hyper-parameters required for training can be found using the default values suggested by the optimizer used, or by using a strategy such as grid search, random search, or Bayesian optimization.

Figure 10:
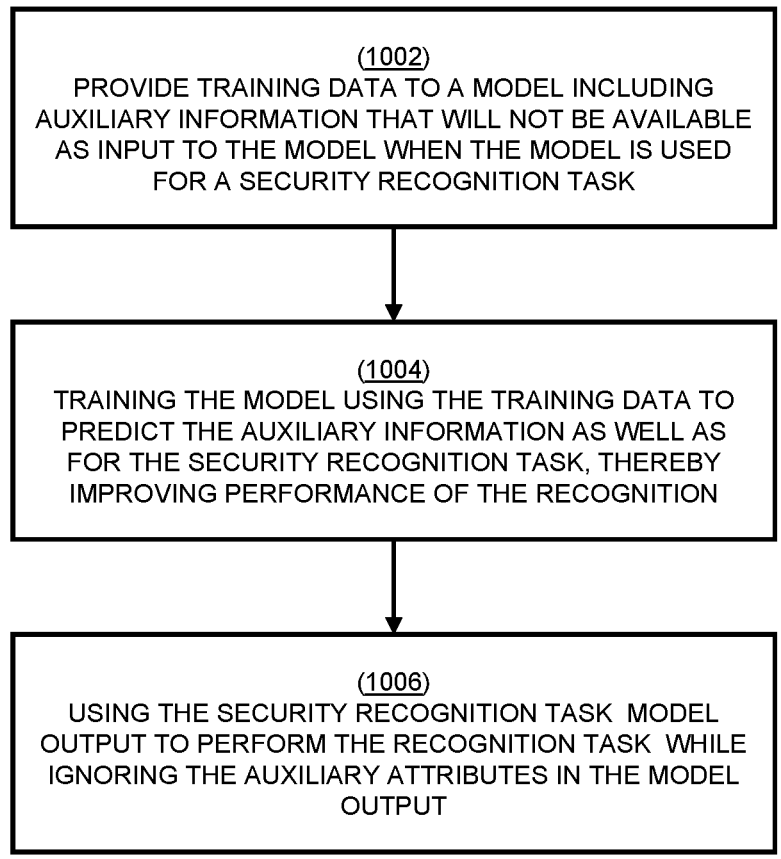
FIG. 10 shows a method for conducting a security recognition task.

FIG. 10 shows a method 1000 for conducting a security recognition task.

Method 1000 comprises steps 1002, 1004, 1006.

Step 1002 comprises providing training data to a model including auxiliary information that will not be available as input to the model when the model is used as a security recognition task model for a security recognition task.

In one embodiment, the security recognition task comprises identifying a portable executable file as malware. In an alternative embodiment, the security recognition task comprises identify suspicious or malicious behaviour.

Further details of the training data, the auxiliary information, and the model, are described in detail in relation to FIGS. 1 to 9 above. For conciseness, these details are not repeated below, but the skilled person will appreciate that the specific features described in relation to FIGS. 1 to 9 are applicable to the features described in relation to the methods of FIGS. 10 and 11.

Step 1004 comprises training the model, as the security recognition task model, using the training data to predict the auxiliary information as well as to perform the security recognition task, thereby improving performance of the security recognition task.

Step 1006 comprises using the security recognition task model output to perform the security recognition task while ignoring the auxiliary attributes in the model output.

Figure 11:
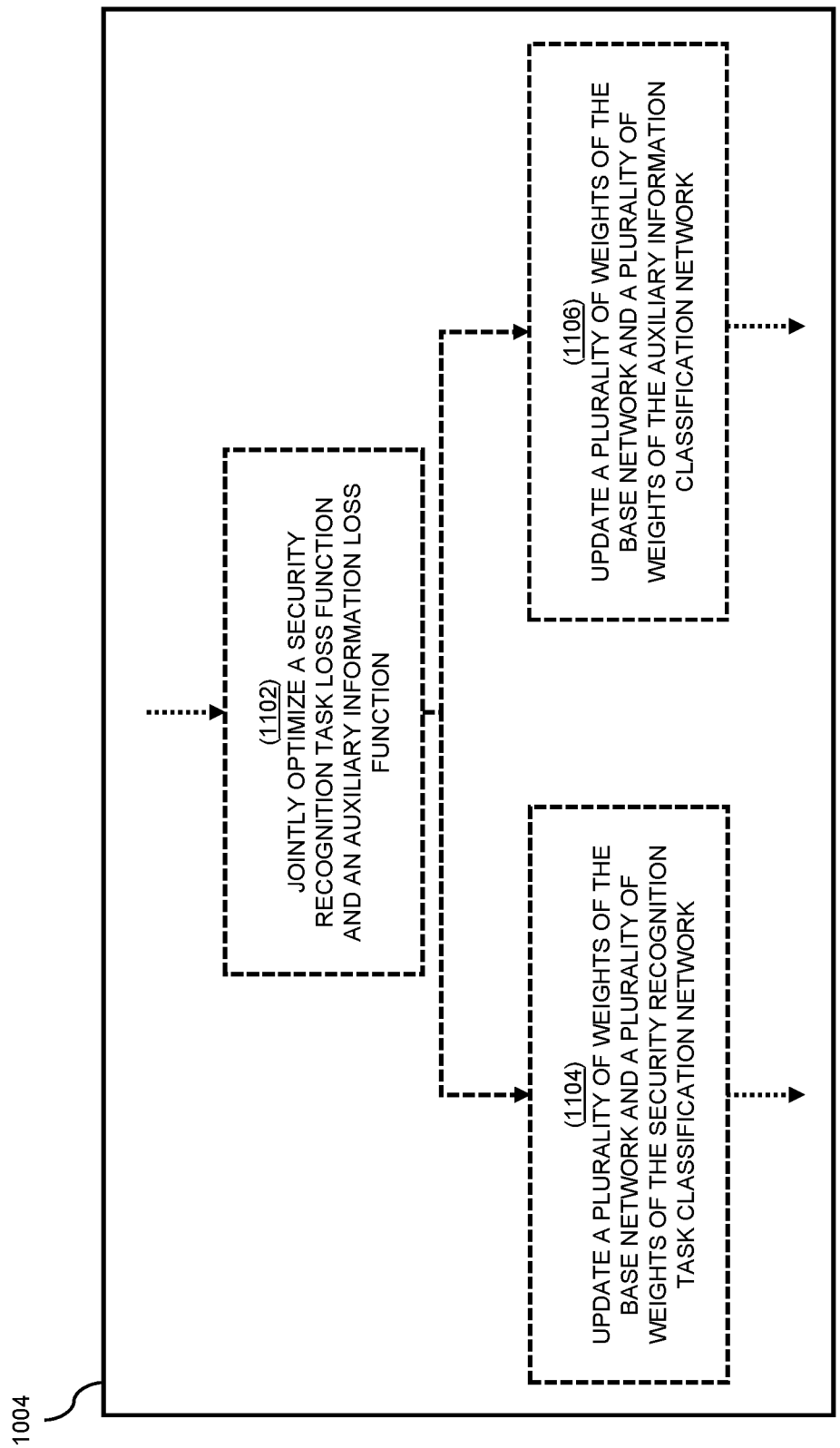
FIG. 11 shows a step of the method of FIG. 10 according to one embodiment.

FIG. 11 shows an embodiment of step 1004 of FIG. 10.

Step 1004 optionally comprises steps 1102, 1104, 1106.

Step 1102 comprises jointly optimizing a security recognition task loss function and an auxiliary information loss function.

Step 1104 comprises updating a configuration of the base network and a plurality of weights of the security recognition task classification network based on the optimizing of the security recognition task loss function.

Step 1106 comprises updating a configuration of the base network and a plurality of weights of the auxiliary information classification network based on the optimizing of the auxiliary information loss function.

Preferably, steps 1102, 1104, 1106 are repeated for a set number of iterations. Alternatively, steps 1102, 1104, 1106 are repeated until the performance of the model being trained converges on a separate validation data set. Preferably, the model is determined to have converged when an error rate of the model on the separate validation data set does not decrease more than a threshold amount over two subsequent iterations of the training process. The error rate of the model is be based on the misclassification rate of the model. Alternatively, the error rate of the model is based on a receiver operating characteristic analysis such that the error rate is equal to 1−AUC, where the AUC is the area under the curve. Preferably, the threshold amount is a number in the range of 0.001 to 0.01, and more preferably is 0.

Figure 12:
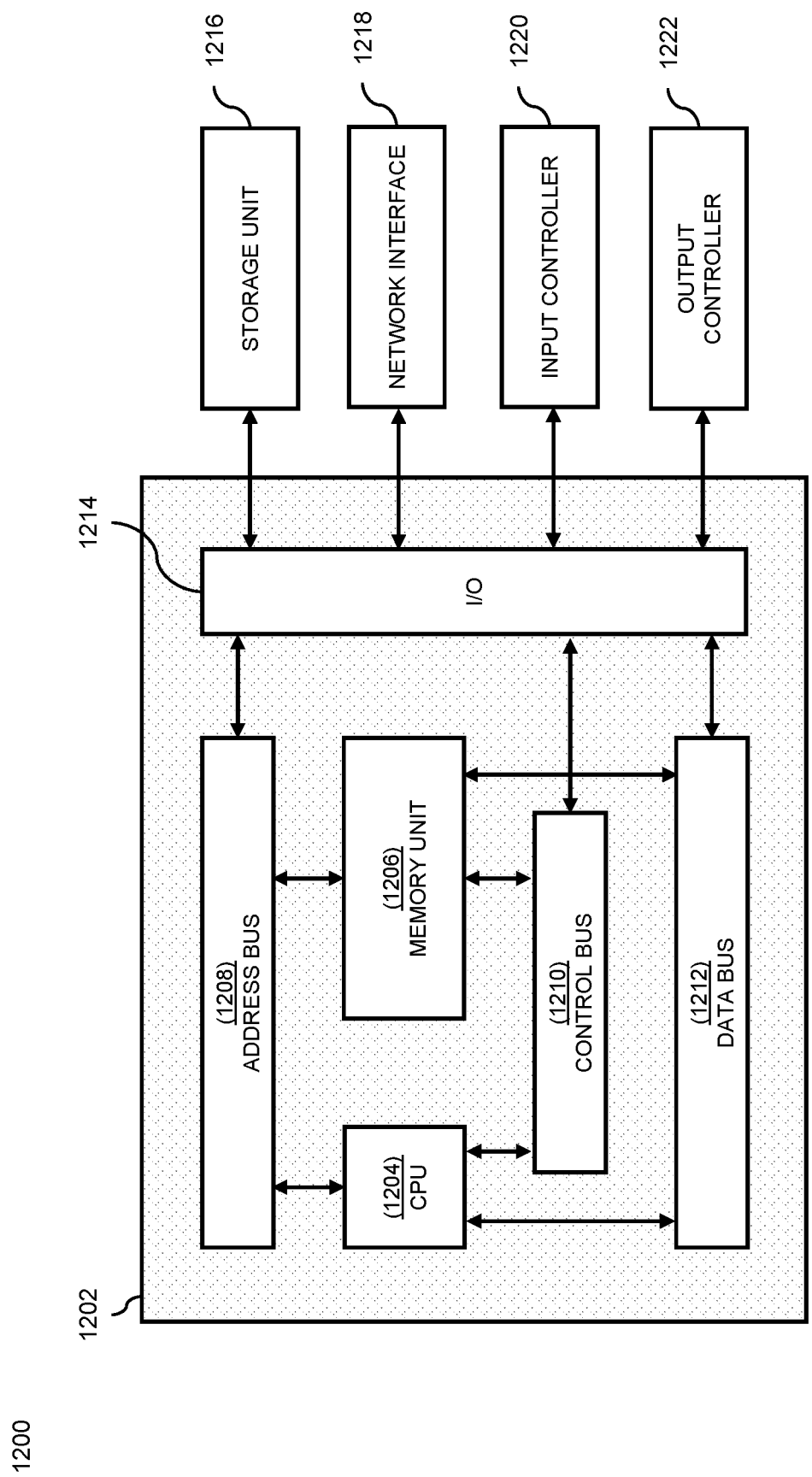
FIG. 12 shows a computing system upon which the invention is implemented.

FIG. 12 shows a block diagram of an embodiment of a computer suitable for performing the method steps of the present disclosure.

Computer 1200 comprises central control unit 1202 comprising CPU 1204 and memory unit 1206. CPU 1204 is communicatively coupled to memory unit 1206 via address bus 1208, control bus 1210, and data bus 1212. Central control unit 1202 further comprises I/O interface 1214 communicatively coupled to address bus 1208, control bus 1210, and data bus 1212.

Computer 1200 further comprises storage unit 1216, network interface 1218, input controller 1220, and output controller 1222. Storage unit 1216, network interface 1218, input controller 1220, and output controller 1222 are communicatively coupled to central control unit 1202 via the I/O interface 1215.

Storage unit 1216 is a computer readable medium comprising one or more programs, the one or more programs comprising instructions which when executed by CPU 1204 cause computer 1200 to perform the method steps of the present disclosure.

Optionally, storage unit 1216 is a non-transitory storage medium.

Exemplary Training Strategy and Configuration

The skilled person will appreciate that any of the above described multi-target models can be trained using an appropriate training data set of portable executable files, security recognition task labels, and auxiliary information.

Preferably, the multi-target models are trained using a training data set along with test and validation data sets. The data is formed of a plurality of portable executable files and associated metadata (auxiliary information) collected from a threat intelligence feed. Preferably the data comprises at least one million portable executable files and associated metadata, and more preferably the data comprises twenty million portable executable files and associated metadata.

Preferably, the data is obtained by randomly sampling a set number of portable executable files and corresponding metadata from a threat intelligence feed at monthly intervals over a one-year period. As the data comprises temporal information relating to metadata issued for portable executable files, the unique SHA for the time first seen is recorded for each portable executable file in order to ensure that every portable executable file in the test/validation set comes temporally after instances in the training set.

For each portable executable file, a 1024-element feature vector is extract using the method described in Saxe and Berlin. The security recognition task label value for each portable executable file is determined using a "1−/5+" criteria for labelling a given portable executable file as malicious or benign. Specifically, if a portable executable file has one or fewer authorities reporting it as malicious, then the portable executable file is given a security recognition task label of 0 (benign). Similarly, if a portable executable file has five or more authorities reporting it as malicious, then the portable executable file is given a security recognition task label of 1 (malicious). If a portable executable file has two, three, or four authorities reporting it as malicious, then the portable executable file is taken as "unlabelled" and the sample is assigned a zero weight so that it does not contribute to the security recognition task loss function during training.

The data is subsampled into training data, validation data, and test data, wherein the validation data is used to monitor convergence during the training process. The data is preferably ordered according to the unique SHA for the time first seen of each portable executable file such that a first batch of the data corresponding to the earliest seen portable executable files is used for training data, a second batch of the data corresponding to the next seen portable executable files is used for validation data, and a third batch of the data corresponding to the most recently seen portable executable files is used for test data. In an example, the data comprises twenty million portable executable files and corresponding metadata and the first batch (i.e., training data) preferably comprises nine million portable executable files and corresponding metadata, the second batch (i.e., validation data) preferably comprises one-hundred thousand portable executable files and corresponding metadata, and the third batch (i.e., test data) comprises the remaining portable executable files and corresponding metadata. The distribution of data into the training data, validation data, and test data, and the cardinality of each batch as described above is in no way intended to be limiting, and the skilled person will appreciate that the number, and indeed the distribution of portable executable files and corresponding metadata used for each batch can be adapted and/or changed as appropriate. Advantageously, the above temporally guided approach to constructing the training data, validation data, and test data helps reduce overestimation of the performance of the multi-target model occurring as a result of the multi-target model being evaluated and tested on data which was extracted at a point in time prior to the data on which the multi-target model was trained. In another embodiment, the training data, validation data, and test data are constructed by performing a random sampling of the data. Indeed, the skilled person will appreciate that any suitable approach to constructing the training data, validation data and test data can be used.

Training is standardised at ten epochs. The models are implemented in Keras and optimized using the ADAM optimizer with Keras' default values.

In the present disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments described herein may relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, Python, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

What is claimed is:

1. A system for conducting a security recognition task, the system comprising:
   a memory configured to store a model and training data, each sample of the training data including a security recognition task label for training the model to perform the security recognition task, the security recognition task label indicative of whether or not each said sample is a security threat, wherein each said sample includes auxiliary information and wherein each said sample is associated with a portable executable file; and
   one or more processors communicably linked to the memory and comprising a training unit and a prediction unit,
   wherein the training unit is configured to:
      receive the training data and the model from the memory and subsequently provide the training data to the model,
      receive the auxiliary information, the auxiliary information including detection data for each sample of the training data from one or more trusted authorities, and
      train the model, as a multi-target neural network, using the training data to predict the detection data in the auxiliary information as well as the security recognition task label for the security recognition task, thereby improving performance of the security recognition task, and
   wherein the prediction unit is configured to:
      use an output of the model to perform the security recognition task on a new sample by predicting the security recognition task label for the new sample.

2. The system of claim 1, wherein the training unit is further configured to jointly optimize a security recognition task loss function and an auxiliary information loss function.

3. The system of claim 2, wherein the training unit is further configured to assign a first weight to the security recognition task loss function and a second weight to the auxiliary information loss function.

4. The system of claim 3, wherein the first weight is greater than the second weight.

5. The system of claim 1, wherein the new sample includes a portable executable file.

6. The system of claim 1, wherein the multi-target neural network comprises:
a base network configured to receive a sample associated with a portable executable file and produce an intermediate output;
a security recognition task classification network configured to receive the intermediate output and produce the security recognition task prediction; and
an auxiliary information classification network configured to receive the intermediate output and produce the auxiliary information prediction.

7. The system of claim 6, wherein the training unit is further configured to update a configuration associated with the base network and a configuration associated with the security recognition task classification network when optimizing a security recognition task loss function.

8. The system of claim 6, wherein the training unit is further configured to update a configuration associated with the base network and a configuration associated with the auxiliary information classification network when optimizing an auxiliary information loss function.

9. The system of claim 6, wherein the base network comprises a plurality of dense blocks.

10. The system of claim 9, wherein each dense block of the plurality of dense blocks comprises a dropout layer, a dense layer, a batch normalisation layer, and an activation function.

11. The system of claim 6, wherein the security recognition task classification network comprises at least one dense layer and an activation function.

12. The system of claim 6, wherein the auxiliary information classification network comprises at least one dense layer and an activation function.

13. The system of claim 1, wherein the training data comprises a plurality of training samples, each associated with a single portable executable file.

14. The system of claim 13, wherein a training sample of the plurality of training samples comprises one or more features, a security recognition task label, and auxiliary information.

15. The system of claim 14, wherein the one or more features of the training sample correspond to one or more features extracted from the single portable executable file.

16. The system of claim 14, wherein the auxiliary information comprises one of a per-authority label or a textual label.

17. The system of claim 1, wherein the security recognition task comprises recognizing portable executable files as malware.

18. A method for conducting a security recognition task, comprising:
providing by a processor, training data to a model stored in a memory, each sample of the training data including:
a threat sample,
a security recognition task label for training the model to perform the security recognition task on the threat sample, the security recognition task label indicative of whether or not each said sample is a security threat, and
auxiliary information in addition to the threat sample, the auxiliary information including detection data associated with the threat sample by one or more trusted authorities;
training the model with the training data to predict, as a multi-target neural network, the detection data in the auxiliary information and the security recognition task label for the security recognition task, thereby improving performance of the security recognition task; and
using an output of the model to perform the security recognition task by predicting the security recognition task label for a new sample.

19. The method of claim 18, wherein training the model using the training data comprises the step of jointly optimizing a security recognition task loss function and an auxiliary information loss function.

20. A non-transitory computer readable medium comprising one or more programs, the one or more programs comprising instructions which when executed by one or more processors of an electronic device cause the electronic device to perform a method for conducting a security recognition task, comprising:
providing by a processor, training data to a model stored in a memory, each sample of the training data including:
a threat sample,
a security recognition task label for training the model to perform the security recognition task on the threat sample, the security recognition task label indicative whether or not each said sample is a is a security threat, and
auxiliary information in addition to the threat sample, the auxiliary information including detection data for each corresponding one of the samples from one or more trusted authorities;
training the model with the training data to predict, as a multi-target neural network, the detection data in the auxiliary information and the security recognition task label for the security recognition task, thereby improving performance of the security recognition task; and
using an output of the model to perform the security recognition task by predicting the security recognition task label for a new sample.

* * * * *